(12) United States Patent
Veillette

(10) Patent No.: US 8,725,274 B2
(45) Date of Patent: *May 13, 2014

(54) ENERGY USE CONTROL SYSTEM AND METHOD

(71) Applicant: Trilliant Networks, Inc., Redwood City, CA (US)

(72) Inventor: Michel Veillette, Waterloo (CA)

(73) Assignee: Trilliant Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/672,262

(22) Filed: Nov. 8, 2012

(65) Prior Publication Data

US 2013/0080800 A1 Mar. 28, 2013

Related U.S. Application Data

(63) Continuation of application No. 12/275,239, filed on Nov. 21, 2008, now Pat. No. 8,332,055.

(60) Provisional application No. 60/989,957, filed on Nov. 25, 2007, provisional application No. 60/989,967, filed on Nov. 25, 2007, provisional application No. 60/989,958, filed on Nov. 25, 2007, provisional application No. 60/989,964, filed on Nov. 25, 2007, provisional application No. 60/989,965, filed on Nov. 25, 2007, provisional application No. 60/989,950, filed on Nov. 25, 2007, provisional application No. 60/989,953, filed on Nov. 25, 2007, provisional application No. 60/989,975, filed on Nov. 25, 2007, provisional application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 60/989,954, filed on Nov. 25, 2007, provisional application No. 60/992,312, filed on Dec. 4, 2007, provisional application No. 60/992,313, filed on Dec. 4, 2007, provisional application No. 60/992,315, filed on Dec. 4, 2007, provisional application No. 61/025,279, filed on Jan. 31, 2008, provisional application No. 61/025,270, filed on Jan. 31, 2008, provisional application No. 61/025,276, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/026,097, filed on Feb. 4, 2008, provisional application No. 61/094,116, filed on Sep. 4, 2008.

(51) Int. Cl.
*G06F 19/00* (2011.01)

(52) U.S. Cl.
USPC ............................................. 700/20; 700/286

(58) Field of Classification Search
USPC .................... 700/20, 22, 286, 294, 297, 298; 702/60–63; 62/176
See application file for complete search history.

(56) References Cited

U.S. PATENT DOCUMENTS

| 4,132,981 A | 1/1979 | White ......................... 340/203 |
| 4,190,800 A | 2/1980 | Kelly, Jr. et al. ................ 325/37 |

(Continued)

FOREIGN PATENT DOCUMENTS

| EP | 0 578 041 B1 | 11/1999 | .............. H04L 12/56 |
| EP | 0 663 746 B1 | 1/2003 | .............. H04L 12/46 |

(Continued)

OTHER PUBLICATIONS

International Search Report and Written Opinion for Application No. PCT/US09/05008, dated Oct. 22, 2009, 8 pp.

(Continued)

*Primary Examiner* — Kidest Bahta
(74) *Attorney, Agent, or Firm* — Moser Taboada

(57) ABSTRACT

Devices and systems control energy usage in accordance with instructions from a head end system. A device may be instructed to cease energy consumption. Another device may allow users to override some instructions. Messages may be provided to users to request the cessation of energy consumption; the users may, but need not comply.

17 Claims, 10 Drawing Sheets

(56) References Cited

U.S. PATENT DOCUMENTS

| | | | |
|---|---|---|---|
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,644,320 A | 2/1987 | Carr et al. | 340/12.37 |
| 4,749,992 A | 6/1988 | Fitzmeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | |
| 5,463,777 A | 10/1995 | Bialkowski et al. | 1/1 |
| 5,465,398 A | 11/1995 | Flammer | 455/69 |
| 5,467,345 A | 11/1995 | Cutter, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Retter et al. | 370/338 |
| 5,572,438 A | 11/1996 | Ehlers et al. | 700/295 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | |
| 5,991,806 A | 11/1999 | McHann, Jr. | |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | |
| 6,058,355 A | 5/2000 | Ahmed et al. | |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colten et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | |
| 6,249,516 B1 | 6/2001 | Brownrigg et al. | |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | |
| 6,407,991 B1 | 6/2002 | Meier | |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | |
| 6,606,708 B1 | 8/2003 | Devine et al. | |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | |
| 6,650,249 B2 | 11/2003 | Meyer et al. | 340/870.28 |
| 6,653,945 B2 | 11/2003 | Johnson et al. | 340/870.02 |

(56) References Cited

U.S. PATENT DOCUMENTS

| | | | |
|---|---|---|---|
| 6,657,552 B2 | 12/2003 | Belski et al. ............. 340/870.02 |
| 6,665,620 B1 | 12/2003 | Burns et al. |
| 6,671,635 B1 | 12/2003 | Forth et al. ...................... 702/61 |
| 6,681,110 B1 | 1/2004 | Crookham et al. ............ 455/420 |
| 6,681,154 B2 | 1/2004 | Nierlich et al. ............... 700/286 |
| 6,684,245 B1 | 1/2004 | Shuey et al. .................. 709/223 |
| 6,687,901 B1 | 2/2004 | Imamatsu .................... 717/173 |
| 6,691,173 B1 | 2/2004 | Morris et al. ................. 709/249 |
| 6,697,331 B1 | 2/2004 | Riihinen et al. |
| 6,710,721 B1 | 3/2004 | Holowick ................ 340/870.02 |
| 6,711,166 B1 | 3/2004 | Amir et al. |
| 6,711,409 B1 | 3/2004 | Zavgren, Jr. et al. ......... 455/445 |
| 6,711,512 B2 | 3/2004 | Noh ............................... 702/65 |
| 6,714,787 B2 | 3/2004 | Reed et al. |
| 6,718,137 B1 | 4/2004 | Chin |
| 6,725,281 B1 | 4/2004 | Zintel et al. |
| 6,728,514 B2 | 4/2004 | Bandeira et al. |
| 6,747,557 B1 | 6/2004 | Petite et al. ................... 340/540 |
| 6,747,981 B2 | 6/2004 | Ardalan et al. ............... 370/401 |
| 6,751,445 B2 | 6/2004 | Kasperkovitz et al. ......... 455/76 |
| 6,751,455 B1 | 6/2004 | Acampora ................. 455/414.1 |
| 6,751,672 B1 | 6/2004 | Khalil et al. |
| 6,772,052 B1 | 8/2004 | Amundsen et al. ........... 700/291 |
| 6,775,258 B1 | 8/2004 | van Valkenburg et al. .... 370/338 |
| 6,778,099 B1 | 8/2004 | Meyer et al. ............. 340/870.02 |
| 6,785,592 B1 | 8/2004 | Smith et al. |
| 6,798,352 B2 | 9/2004 | Holowick ................ 340/870.02 |
| 6,801,865 B2 | 10/2004 | Gilgenbach et al. ............ 702/61 |
| 6,826,620 B1 | 11/2004 | Mawhinney et al. |
| 6,829,216 B1 | 12/2004 | Nakata |
| 6,829,347 B1 | 12/2004 | Odiaka |
| 6,831,921 B2 | 12/2004 | Higgins |
| 6,836,737 B2 | 12/2004 | Petite et al. ..................... 702/62 |
| 6,839,775 B1 | 1/2005 | Kao et al. ...................... 710/15 |
| 6,842,706 B1 | 1/2005 | Baraty ............................. 702/61 |
| 6,845,091 B2 | 1/2005 | Ogier et al. ................... 370/338 |
| 6,859,186 B2 | 2/2005 | Lizalek et al. ................. 343/767 |
| 6,865,185 B1 | 3/2005 | Patel et al. |
| 6,882,635 B2 | 4/2005 | Eitan et al. .................... 370/338 |
| 6,885,309 B1 | 4/2005 | Van Heteren ............ 340/870.11 |
| 6,891,838 B1 | 5/2005 | Petite et al. ................... 370/401 |
| 6,900,738 B2 | 5/2005 | Crichlow ................. 340/870.02 |
| 6,904,025 B1 | 6/2005 | Madour et al. |
| 6,904,385 B1 | 6/2005 | Budike, Jr. .................... 702/182 |
| 6,909,705 B1 | 6/2005 | Lee et al. ...................... 370/338 |
| 6,914,533 B2 | 7/2005 | Petite ............................ 340/628 |
| 6,914,893 B2 | 7/2005 | Petite ............................ 370/338 |
| 6,946,972 B2 | 9/2005 | Mueller et al. ........... 340/870.02 |
| 6,954,814 B1 | 10/2005 | Leach ............................ 710/305 |
| 6,963,285 B2 | 11/2005 | Fischer et al. ................. 340/635 |
| 6,967,452 B2 | 11/2005 | Aiso et al. |
| 6,970,434 B1 | 11/2005 | Mahany et al. ............... 370/256 |
| 6,970,771 B1 | 11/2005 | Preiss et al. |
| 6,975,613 B1 | 12/2005 | Johansson .................... 370/338 |
| 6,980,973 B1 | 12/2005 | Karpenko ..................... 705/412 |
| 6,982,651 B2 | 1/2006 | Fischer |
| 6,985,087 B2 | 1/2006 | Soliman ................... 340/870.02 |
| 6,995,666 B1 | 2/2006 | Luttrell ....................... 340/539.1 |
| 6,999,441 B2 | 2/2006 | Flammer, III et al. ........ 370/337 |
| 7,009,379 B2 | 3/2006 | Ramirez ........................ 324/142 |
| 7,009,493 B2 | 3/2006 | Howard et al. |
| 7,010,363 B2 | 3/2006 | Donnelly et al. ................ 700/19 |
| 7,016,336 B2 | 3/2006 | Sorensen ...................... 370/351 |
| 7,020,701 B1 | 3/2006 | Gelvin et al. |
| 7,042,368 B2 | 5/2006 | Patterson et al. ......... 340/870.29 |
| 7,046,682 B2 | 5/2006 | Carpenter et al. ............ 370/401 |
| 7,053,767 B2 | 5/2006 | Petite et al. ................... 340/531 |
| 7,053,853 B2 | 5/2006 | Merenda et al. .............. 343/820 |
| 7,054,271 B2 | 5/2006 | Brownrigg et al. |
| 7,062,361 B1 | 6/2006 | Lane ............................. 700/295 |
| 7,064,679 B2 | 6/2006 | Ehrke et al. ............. 340/870.02 |
| 7,072,945 B1 | 7/2006 | Nieminen et al. ............ 709/217 |
| 7,079,810 B2 | 7/2006 | Petite et al. ................... 455/41.2 |
| 7,089,089 B2 | 8/2006 | Cumming et al. ............ 700/295 |
| 7,102,533 B2 | 9/2006 | Kim ........................ 340/870.02 |
| 7,103,086 B2 | 9/2006 | Steed et al. .................... 375/132 |
| 7,103,511 B2 | 9/2006 | Petite |
| 7,106,044 B1 | 9/2006 | Lee, Jr. et al. ................. 324/110 |
| 7,119,713 B2 | 10/2006 | Shuey et al. ............. 340/870.02 |
| 7,126,494 B2 | 10/2006 | Ardalan et al. .......... 340/870.02 |
| 7,135,850 B2 | 11/2006 | Ramirez ........................ 324/142 |
| 7,135,956 B2 | 11/2006 | Bartone et al. .................. 340/3.9 |
| 7,137,550 B1 | 11/2006 | Petite ............................ 235/379 |
| 7,143,204 B1 | 11/2006 | Kao et al. ........................ 710/18 |
| 7,145,474 B2 | 12/2006 | Shuey et al. ............. 340/870.03 |
| 7,170,425 B2 | 1/2007 | Christopher et al. .... 340/870.02 |
| 7,174,260 B2 | 2/2007 | Tuff et al. ....................... 702/61 |
| 7,185,131 B2 | 2/2007 | Leach ........................... 710/305 |
| 7,188,003 B2 | 3/2007 | Ransom et al. ............... 700/286 |
| 7,197,046 B1 | 3/2007 | Hariharasubrahmanian . 370/466 |
| 7,200,633 B2 | 4/2007 | Sekiguchi et al. |
| 7,209,840 B2 | 4/2007 | Petite et al. ..................... 702/62 |
| 7,215,926 B2 | 5/2007 | Corbett et al. |
| 7,222,111 B1 | 5/2007 | Budike, Jr. .................... 705/412 |
| 7,230,544 B2 | 6/2007 | Van Heteren ............ 340/870.03 |
| 7,230,931 B2 | 6/2007 | Struhsaker .................... 370/280 |
| 7,231,482 B2 | 6/2007 | Leach ........................... 710/305 |
| 7,245,938 B2 | 7/2007 | Sobczak et al. ............. 455/562.1 |
| 7,248,181 B2 | 7/2007 | Patterson et al. ......... 340/870.03 |
| 7,248,861 B2 | 7/2007 | Lazaridis et al. |
| 7,250,874 B2 | 7/2007 | Mueller et al. .......... 340/870.06 |
| 7,251,570 B2 | 7/2007 | Hancock et al. |
| 7,263,073 B2 | 8/2007 | Petite et al. ................... 370/278 |
| 7,271,735 B2 | 9/2007 | Rogai ...................... 340/870.02 |
| 7,274,305 B2 | 9/2007 | Luttrell .................... 340/870.02 |
| 7,274,975 B2 | 9/2007 | Miller ........................... 700/295 |
| 7,277,027 B2 | 10/2007 | Ehrke et al. ............. 340/870.12 |
| 7,277,967 B2 | 10/2007 | Kao et al. ........................ 710/18 |
| 7,289,887 B2 | 10/2007 | Rodgers ........................ 700/295 |
| 7,295,128 B2 | 11/2007 | Petite ............................ 340/628 |
| 7,301,476 B2 | 11/2007 | Shuey et al. ............. 340/870.03 |
| 7,304,587 B2 | 12/2007 | Boaz ....................... 340/870.02 |
| 7,308,370 B2 | 12/2007 | Mason, Jr. et al. .............. 702/65 |
| 7,312,721 B2 | 12/2007 | Mason, Jr. et al. ....... 340/870.02 |
| 7,315,257 B2 | 1/2008 | Patterson et al. ......... 340/870.02 |
| 7,317,404 B2 | 1/2008 | Cumeralto et al. ....... 340/870.02 |
| 7,321,316 B2 | 1/2008 | Hancock et al. ......... 340/870.02 |
| 7,324,453 B2 | 1/2008 | Wu et al. ....................... 370/238 |
| 7,327,998 B2 | 2/2008 | Kumar et al. ................. 455/405 |
| 7,346,463 B2 | 3/2008 | Petite et al. ..................... 702/62 |
| 7,348,769 B2 | 3/2008 | Ramirez ..................... 324/158.1 |
| 7,349,766 B2 | 3/2008 | Rodgers ........................ 700/295 |
| 7,362,709 B1 | 4/2008 | Hui et al. ...................... 370/237 |
| 7,366,113 B1 | 4/2008 | Chandra et al. .............. 370/255 |
| 7,366,191 B2 | 4/2008 | Higashiyama ................ 370/406 |
| 7,379,981 B2 | 5/2008 | Elliott et al. .................. 709/220 |
| 7,397,907 B2 | 7/2008 | Petite ............................ 379/155 |
| 7,406,298 B2 | 7/2008 | Luglio et al. ................. 455/90.3 |
| 7,411,964 B2 | 8/2008 | Suemura ....................... 370/400 |
| 7,427,927 B2 | 9/2008 | Borleske et al. ......... 340/870.02 |
| 6,249,516 C1 | 11/2008 | Brownrigg et al. |
| 7,451,019 B2 | 11/2008 | Rodgers ........................ 700/295 |
| 7,457,273 B2 | 11/2008 | Nakanishi et al. ............ 370/338 |
| 7,468,661 B2 | 12/2008 | Petite et al. ................... 340/540 |
| 7,487,282 B2 | 2/2009 | Leach ........................... 710/305 |
| 7,495,578 B2 | 2/2009 | Borleske ................. 340/870.02 |
| 7,498,873 B2 | 3/2009 | Opshaug et al. .............. 329/315 |
| 7,505,453 B2 | 3/2009 | Carpenter et al. ............ 370/352 |
| 7,512,234 B2 | 3/2009 | McDonnell et al. .......... 380/247 |
| 7,515,571 B2 | 4/2009 | Kwon et al. .................. 370/338 |
| 7,516,106 B2 | 4/2009 | Ehlers et al. .................. 705/412 |
| 7,522,540 B1 | 4/2009 | Maufer ......................... 370/254 |
| 7,522,639 B1 | 4/2009 | Katz .............................. 370/503 |
| 7,539,151 B2 | 5/2009 | Demirhan et al. ............ 370/254 |
| 7,545,285 B2 | 6/2009 | Shuey et al. ............. 340/870.02 |
| 7,546,595 B1 | 6/2009 | Wickham et al. ............. 717/168 |
| 7,548,826 B2 | 6/2009 | Witter et al. .................. 702/115 |
| 7,548,907 B2 | 6/2009 | Wall et al. ......................... 1/1 |
| 7,554,941 B2 | 6/2009 | Ratiu et al. .................... 370/328 |
| 7,562,024 B2 | 7/2009 | Brooks et al. ................. 705/1.1 |
| 7,571,865 B2 | 8/2009 | Nicodem et al. ................ 236/51 |
| 7,586,420 B2 | 9/2009 | Fischer et al. ................. 340/635 |
| 7,599,665 B2 | 10/2009 | Sinivaara .................... 455/67.16 |
| 7,602,747 B2 | 10/2009 | Maksymczuk et al. ....... 370/331 |

(56) References Cited

U.S. PATENT DOCUMENTS

| | | |
|---|---|---|
| 7,609,673 B2 | 10/2009 | Bergenlid et al. ............. 370/329 |
| 7,613,147 B2 | 11/2009 | Bergenlid et al. ............. 370/329 |
| 7,623,043 B2 | 11/2009 | Mizra et al. ............... 340/870.02 |
| 7,626,967 B2 | 12/2009 | Yarvis et al. .................. 370/338 |
| 7,650,425 B2 | 1/2010 | Davis et al. ................... 709/238 |
| 7,676,231 B2 | 3/2010 | Demirhan et al. ......... 455/452.1 |
| 7,680,041 B2 | 3/2010 | Johansen ...................... 370/230 |
| 7,729,496 B2 | 6/2010 | Hacigumus .................. 380/277 |
| 7,733,224 B2 | 6/2010 | Tran .............................. 340/540 |
| 7,743,224 B2 | 6/2010 | Wang ........................... 711/154 |
| 7,756,538 B2 | 7/2010 | Bonta et al. .................. 455/517 |
| 7,788,491 B1 | 8/2010 | Dawson ........................ 713/168 |
| 7,802,245 B2 | 9/2010 | Sonnier et al. ............... 717/171 |
| 7,814,322 B2 | 10/2010 | Gurevich et al. ............. 713/171 |
| 7,818,758 B2 | 10/2010 | de Bonet et al. ............. 719/328 |
| 7,847,706 B1 | 12/2010 | Ross et al. .................. 340/12.52 |
| 8,051,415 B2 | 11/2011 | Suzuki .......................... 717/168 |
| 2001/0005368 A1 | 6/2001 | Rune ............................. 370/390 |
| 2001/0010032 A1 | 7/2001 | Ehlers et al. .................... 702/62 |
| 2001/0038342 A1 | 11/2001 | Foote |
| 2001/0046879 A1 | 11/2001 | Schramm et al. |
| 2002/0012358 A1 | 1/2002 | Sato |
| 2002/0013679 A1 | 1/2002 | Petite ............................ 702/188 |
| 2002/0031101 A1 | 3/2002 | Petite et al. ................... 370/310 |
| 2002/0051269 A1 | 5/2002 | Margalit et al. .............. 398/126 |
| 2002/0066095 A1 | 5/2002 | Yu ................................ 717/173 |
| 2002/0110118 A1 | 8/2002 | Foley |
| 2002/0114303 A1 | 8/2002 | Crosbie et al. ............... 370/338 |
| 2002/0120569 A1 | 8/2002 | Day ................................ 705/40 |
| 2002/0174354 A1 | 11/2002 | Bel et al. ...................... 713/193 |
| 2002/0186619 A1 | 12/2002 | Reeves et al. .................. 368/47 |
| 2003/0001640 A1 | 1/2003 | Lao et al. |
| 2003/0001754 A1 | 1/2003 | Johnson et al. .......... 340/870.02 |
| 2003/0014633 A1 | 1/2003 | Gruber .......................... 713/170 |
| 2003/0033394 A1 | 2/2003 | Stine ............................. 709/222 |
| 2003/0037268 A1 | 2/2003 | Kistler |
| 2003/0050737 A1 | 3/2003 | Osann ........................... 700/276 |
| 2003/0112822 A1 | 6/2003 | Hong et al. ................... 370/469 |
| 2003/0117966 A1 | 6/2003 | Chen ............................. 370/255 |
| 2003/0122686 A1 | 7/2003 | Ehrke et al. .............. 340/870.02 |
| 2003/0123481 A1 | 7/2003 | Neale et al. |
| 2003/0156715 A1 | 8/2003 | Reeds, III et al. .............. 380/37 |
| 2003/0207697 A1 | 11/2003 | Shpak ........................... 455/524 |
| 2003/0229900 A1 | 12/2003 | Reisman ........................ 725/87 |
| 2003/0233201 A1 | 12/2003 | Horst et al. ..................... 702/62 |
| 2004/0008663 A1 | 1/2004 | Srikrishna et al. ............ 370/351 |
| 2004/0031030 A1 | 2/2004 | Kidder et al. |
| 2004/0034773 A1 | 2/2004 | Balabine et al. |
| 2004/0039817 A1 | 2/2004 | Lee et al. ...................... 709/225 |
| 2004/0056775 A1 | 3/2004 | Crookham et al. ........... 340/825 |
| 2004/0066310 A1 | 4/2004 | Ehrke et al. ............. 340/870.02 |
| 2004/0077341 A1 | 4/2004 | Chandranmenon et al. .. 455/418 |
| 2004/0081086 A1 | 4/2004 | Hippelainen et al. ......... 370/227 |
| 2004/0082203 A1 | 4/2004 | Logvinov et al. .............. 439/10 |
| 2004/0100953 A1 | 5/2004 | Chen et al. .................... 370/389 |
| 2004/0113810 A1 | 6/2004 | Mason, Jr. et al. ...... 340/870.02 |
| 2004/0117788 A1 | 6/2004 | Karaguz et al. |
| 2004/0125776 A1 | 7/2004 | Haugli et al. |
| 2004/0138787 A1 | 7/2004 | Ransom et al. |
| 2004/0140908 A1 | 7/2004 | Gladwin et al. ......... 340/870.02 |
| 2004/0157613 A1 | 8/2004 | Steer et al. |
| 2004/0183687 A1 | 9/2004 | Petite et al. ................... 340/601 |
| 2004/0185845 A1 | 9/2004 | Abhishek et al. ........... 455/422.1 |
| 2004/0193329 A1 | 9/2004 | Ransom et al. ............... 700/286 |
| 2004/0210544 A1 | 10/2004 | Shuey et al. .................. 705/412 |
| 2004/0268142 A1 | 12/2004 | Karjala et al. .................. 726/15 |
| 2005/0026569 A1 | 2/2005 | Lim et al. ....................... 455/73 |
| 2005/0027859 A1 | 2/2005 | Alvisi et al. |
| 2005/0030968 A1 | 2/2005 | Rich et al. |
| 2005/0033967 A1 | 2/2005 | Morino et al. ................ 713/182 |
| 2005/0055432 A1 | 3/2005 | Rodgers ........................ 709/223 |
| 2005/0058144 A1 | 3/2005 | Ayyagari et al. |
| 2005/0065742 A1 | 3/2005 | Rodgers |
| 2005/0122944 A1 | 6/2005 | Kwon et al. .................. 370/338 |
| 2005/0136972 A1 | 6/2005 | Smith et al. ................ 455/554.1 |
| 2005/0172024 A1 | 8/2005 | Cheifot et al. |
| 2005/0187928 A1 | 8/2005 | Byers .................................. 1/1 |
| 2005/0193390 A1 | 9/2005 | Suzuki et al. ................. 717/178 |
| 2005/0195757 A1 | 9/2005 | Kidder et al. ................. 370/278 |
| 2005/0201397 A1 | 9/2005 | Petite ............................ 370/401 |
| 2005/0228874 A1 | 10/2005 | Edgett et al. .................. 709/220 |
| 2005/0243867 A1 | 11/2005 | Petite ............................ 370/474 |
| 2005/0249113 A1 | 11/2005 | Kobayashi et al. ........... 370/219 |
| 2005/0251403 A1 | 11/2005 | Shuey ............................... 705/1 |
| 2005/0257215 A1 | 11/2005 | Denby et al. |
| 2005/0270173 A1 | 12/2005 | Boaz ......................... 340/870.02 |
| 2005/0276243 A1 | 12/2005 | Sugaya et al. ................ 370/328 |
| 2005/0286440 A1 | 12/2005 | Strutt et al. ................... 370/253 |
| 2006/0028355 A1 | 2/2006 | Patterson et al. ......... 340/870.02 |
| 2006/0055432 A1 | 3/2006 | Shimokawa et al. ............. 327/5 |
| 2006/0056363 A1 | 3/2006 | Ratiu et al. |
| 2006/0056368 A1 | 3/2006 | Ratiu et al. |
| 2006/0077906 A1 | 4/2006 | Maegawa et al. ............. 370/254 |
| 2006/0087993 A1 | 4/2006 | Sengupta et al. ............. 370/310 |
| 2006/0098576 A1 | 5/2006 | Brownrigg et al. |
| 2006/0098604 A1 | 5/2006 | Flammer, III et al. ........ 370/337 |
| 2006/0111111 A1 | 5/2006 | Ovadia |
| 2006/0130053 A1 | 6/2006 | Buljore et al. ................ 717/173 |
| 2006/0140135 A1 | 6/2006 | Bonta et al. ................... 370/254 |
| 2006/0146717 A1 | 7/2006 | Conner et al. ................ 370/238 |
| 2006/0158347 A1 | 7/2006 | Roche et al. ............. 340/870.02 |
| 2006/0161310 A1 | 7/2006 | Lal ................................ 700/295 |
| 2006/0167784 A1 | 7/2006 | Hoffberg |
| 2006/0184288 A1 | 8/2006 | Rodgers ........................ 700/295 |
| 2006/0215583 A1 | 9/2006 | Castagnoli |
| 2006/0215673 A1 | 9/2006 | Olvera-Hernandez |
| 2006/0217936 A1 | 9/2006 | Mason et al. ................. 702/188 |
| 2006/0230276 A1 | 10/2006 | Nochta .......................... 713/176 |
| 2006/0271244 A1 | 11/2006 | Cumming et al. ............ 700/291 |
| 2006/0271678 A1 | 11/2006 | Jessup et al. |
| 2007/0001868 A1 | 1/2007 | Boaz |
| 2007/0013547 A1 | 1/2007 | Boaz ......................... 340/870.02 |
| 2007/0019598 A1 | 1/2007 | Prehofer |
| 2007/0036353 A1 | 2/2007 | Reznik et al. ................... 380/30 |
| 2007/0057767 A1 | 3/2007 | Sun et al. |
| 2007/0060147 A1 | 3/2007 | Shin et al. ..................... 455/445 |
| 2007/0063866 A1 | 3/2007 | Webb ....................... 340/870.02 |
| 2007/0063868 A1 | 3/2007 | Borleske .................. 340/870.03 |
| 2007/0085700 A1 | 4/2007 | Walters et al. |
| 2007/0087756 A1 | 4/2007 | Hoffberg |
| 2007/0089110 A1 | 4/2007 | Li .................................. 717/178 |
| 2007/0101442 A1 | 5/2007 | Bondurant ...................... 726/34 |
| 2007/0103324 A1 | 5/2007 | Kosuge et al. |
| 2007/0109121 A1 | 5/2007 | Cohen |
| 2007/0110024 A1 | 5/2007 | Meier ............................ 370/351 |
| 2007/0120705 A1 | 5/2007 | Kiiskila et al. ........... 340/870.02 |
| 2007/0136817 A1 | 6/2007 | Nguyen |
| 2007/0139220 A1 | 6/2007 | Mirza et al. .............. 340/870.02 |
| 2007/0143046 A1 | 6/2007 | Budike, Jr. ...................... 702/62 |
| 2007/0147268 A1 | 6/2007 | Kelley et al. ................. 370/254 |
| 2007/0169074 A1 | 7/2007 | Koo et al. |
| 2007/0169075 A1 | 7/2007 | Lill et al. |
| 2007/0169080 A1 | 7/2007 | Friedman |
| 2007/0174467 A1 | 7/2007 | Ballou, Jr. et al. ............ 709/227 |
| 2007/0177538 A1 | 8/2007 | Christensen et al. ......... 370/328 |
| 2007/0177576 A1 | 8/2007 | Johansen et al. ............. 370/351 |
| 2007/0177613 A1 | 8/2007 | Shorty et al. ................. 370/401 |
| 2007/0189249 A1 | 8/2007 | Gurevich et al. |
| 2007/0200729 A1 | 8/2007 | Borleske et al. .......... 340/870.02 |
| 2007/0201504 A1 | 8/2007 | Christensen et al. ......... 370/437 |
| 2007/0204009 A1 | 8/2007 | Shorty et al. ................. 709/218 |
| 2007/0205915 A1 | 9/2007 | Shuey et al. .............. 340/870.02 |
| 2007/0206503 A1 | 9/2007 | Gong et al. ................... 370/238 |
| 2007/0206521 A1 | 9/2007 | Osaje ............................ 370/315 |
| 2007/0207811 A1 | 9/2007 | Das et al. |
| 2007/0210933 A1 | 9/2007 | Leach ....................... 340/870.02 |
| 2007/0211636 A1 | 9/2007 | Bellur et al. .................. 370/238 |
| 2007/0239477 A1 | 10/2007 | Budike, Jr. ..................... 705/412 |
| 2007/0248047 A1 | 10/2007 | Shorty et al. |
| 2007/0257813 A1 | 11/2007 | Vaswani et al. .......... 340/870.02 |
| 2007/0258508 A1 | 11/2007 | Werb et al. |
| 2007/0263647 A1 | 11/2007 | Shorty et al. ................. 370/406 |
| 2007/0265947 A1 | 11/2007 | Schimpf et al. ................ 705/35 |
| 2007/0266429 A1 | 11/2007 | Ginter et al. |

(56) References Cited

U.S. PATENT DOCUMENTS

| | | | |
|---|---|---|---|
| 2007/0271006 A1 | 11/2007 | Golden et al. ............... 700/295 |
| 2007/0276547 A1 | 11/2007 | Miller ........................ 700/295 |
| 2008/0011864 A1 | 1/2008 | Tessier et al. ................... 236/51 |
| 2008/0018492 A1 | 1/2008 | Ehrke et al. ............ 340/870.03 |
| 2008/0024320 A1 | 1/2008 | Ehrke et al. ............ 340/870.02 |
| 2008/0031145 A1 | 2/2008 | Ethier et al. .................. 370/248 |
| 2008/0032703 A1 | 2/2008 | Krumm et al. ............. 455/456.1 |
| 2008/0037569 A1 | 2/2008 | Werb et al. .................... 370/406 |
| 2008/0042874 A1 | 2/2008 | Rogai ........................ 340/870.03 |
| 2008/0046388 A1 | 2/2008 | Budike, Jr. ..................... 705/412 |
| 2008/0048883 A1 | 2/2008 | Boaz ........................ 340/870.02 |
| 2008/0051036 A1 | 2/2008 | Vaswani et al. ................... 455/69 |
| 2008/0063205 A1 | 3/2008 | Braskich et al. ................ 380/270 |
| 2008/0068217 A1 | 3/2008 | Van Wyk et al. ........... 340/870.11 |
| 2008/0068994 A1 | 3/2008 | Garrison et al. ................ 370/230 |
| 2008/0068996 A1 | 3/2008 | Clave et al. ................... 370/230.1 |
| 2008/0086560 A1 | 4/2008 | Monier et al. .................. 709/224 |
| 2008/0089314 A1 | 4/2008 | Meyer et al. ................... 370/349 |
| 2008/0095221 A1 | 4/2008 | Picard ........................... 375/224 |
| 2008/0097782 A1 | 4/2008 | Budike, Jr. ..................... 705/1.1 |
| 2008/0107034 A1 | 5/2008 | Jetcheva et al. ................ 370/238 |
| 2008/0117110 A1 | 5/2008 | Luglio et al. ................... 343/702 |
| 2008/0129538 A1 | 6/2008 | Vaswani et al. ........... 340/870.03 |
| 2008/0130535 A1 | 6/2008 | Shorty et al. .................. 370/310 |
| 2008/0130562 A1 | 6/2008 | Shorty et al. .................. 370/329 |
| 2008/0132185 A1 | 6/2008 | Elliott et al. ................ 455/115.4 |
| 2008/0136667 A1 | 6/2008 | Vaswani et al. ........... 340/870.02 |
| 2008/0151795 A1 | 6/2008 | Shorty et al. .................. 370/310 |
| 2008/0151824 A1 | 6/2008 | Shorty et al. .................. 370/329 |
| 2008/0151825 A1 | 6/2008 | Shorty et al. .................. 370/329 |
| 2008/0151826 A1 | 6/2008 | Shorty et al. .................. 370/329 |
| 2008/0151827 A1 | 6/2008 | Shorty et al. .................. 370/329 |
| 2008/0154396 A1 | 6/2008 | Shorty et al. ...................... 700/90 |
| 2008/0159213 A1 | 7/2008 | Shorty et al. .................. 370/329 |
| 2008/0165712 A1 | 7/2008 | Shorty et al. .................. 370/310 |
| 2008/0170511 A1 | 7/2008 | Shorty et al. .................. 370/254 |
| 2008/0177678 A1 | 7/2008 | Di Martini et al. ............ 705/512 |
| 2008/0180274 A1 | 7/2008 | Cumeralto et al. ....... 340/870.02 |
| 2008/0181133 A1 | 7/2008 | Thubert et al. ................. 370/255 |
| 2008/0183339 A1 | 7/2008 | Vaswani et al. ............... 700/297 |
| 2008/0186202 A1 | 8/2008 | Vaswani et al. ........... 340/870.03 |
| 2008/0186203 A1 | 8/2008 | Vaswani et al. ........... 340/870.11 |
| 2008/0187001 A1 | 8/2008 | Vaswani et al. ............... 370/466 |
| 2008/0187116 A1 | 8/2008 | Reeves et al. ............ 379/106.09 |
| 2008/0189415 A1 | 8/2008 | Vaswani et al. ............... 709/226 |
| 2008/0189436 A1 | 8/2008 | Vaswani et al. ............... 709/242 |
| 2008/0204272 A1 | 8/2008 | Ehrke et al. ............ 340/870.02 |
| 2008/0205355 A1 | 8/2008 | Liu et al. ........................ 370/338 |
| 2008/0224891 A1 | 9/2008 | Ehrke et al. ............ 340/870.02 |
| 2008/0225737 A1 | 9/2008 | Gong et al. ..................... 370/252 |
| 2008/0238714 A1 | 10/2008 | Ehrke et al. ............ 340/870.02 |
| 2008/0238716 A1 | 10/2008 | Ehrke et al. ............ 340/870.03 |
| 2008/0272934 A1 | 11/2008 | Wang et al. ............... 340/870.11 |
| 2008/0283620 A1 | 11/2008 | Knapp ........................ 236/12.16 |
| 2008/0310311 A1 | 12/2008 | Flammer et al. .............. 370/238 |
| 2008/0310377 A1 | 12/2008 | Flammer et al. .............. 370/338 |
| 2008/0317047 A1 | 12/2008 | Zeng et al. ..................... 370/401 |
| 2008/0318547 A1 | 12/2008 | Ballou, Jr. et al. ............ 455/410 |
| 2009/0003214 A1 | 1/2009 | Vaswani et al. ............... 370/236 |
| 2009/0003232 A1 | 1/2009 | Vaswani et al. ............... 370/252 |
| 2009/0003243 A1 | 1/2009 | Vaswani et al. ............... 370/255 |
| 2009/0003356 A1 | 1/2009 | Vaswani et al. ............... 370/400 |
| 2009/0010178 A1 | 1/2009 | Tekippe ........................ 370/254 |
| 2009/0034418 A1 | 2/2009 | Flammer, III et al. ........ 370/238 |
| 2009/0034419 A1 | 2/2009 | Flammer, III et al. ........ 370/238 |
| 2009/0034432 A1 | 2/2009 | Bonta et al. .................... 370/255 |
| 2009/0043911 A1 | 2/2009 | Flammer et al. .............. 709/238 |
| 2009/0046732 A1 | 2/2009 | Pratt, Jr. et al. ................ 370/406 |
| 2009/0055032 A1 | 2/2009 | Rodgers ........................ 700/295 |
| 2009/0068947 A1 | 3/2009 | Petite ............................ 455/462 |
| 2009/0077405 A1 | 3/2009 | Johansen ...................... 713/323 |
| 2009/0079584 A1 | 3/2009 | Grady et al. ............ 340/870.02 |
| 2009/0082888 A1 | 3/2009 | Johansen ........................ 700/94 |
| 2009/0096605 A1 | 4/2009 | Petite et al. ............ 340/539.22 |
| 2009/0102737 A1 | 4/2009 | Birnbaum et al. ............. 343/828 |
| 2009/0115626 A1 | 5/2009 | Vaswani et al. .......... 340/870.02 |
| 2009/0129575 A1 | 5/2009 | Chakroaborty et al. .. 379/201.03 |
| 2009/0132220 A1 | 5/2009 | Chakroborty et al. .......... 703/13 |
| 2009/0134969 A1 | 5/2009 | Veillette ........................ 340/3.1 |
| 2009/0135677 A1 | 5/2009 | Veillette .......................... 368/47 |
| 2009/0135716 A1 | 5/2009 | Veillette ........................ 370/221 |
| 2009/0135843 A1 | 5/2009 | Veillette ........................ 370/406 |
| 2009/0136042 A1 | 5/2009 | Veillette ........................ 380/279 |
| 2009/0138777 A1 | 5/2009 | Veillette ........................ 714/748 |
| 2009/0161594 A1 | 6/2009 | Zhu et al. ...................... 370/312 |
| 2009/0167547 A1 | 7/2009 | Gilbert ........................ 340/662 |
| 2009/0168846 A1 | 7/2009 | Filippo III et al. ............ 375/133 |
| 2009/0175238 A1 | 7/2009 | Jetcheva et al. ............... 370/329 |
| 2009/0179771 A1 | 7/2009 | Seal et al. ................ 340/870.04 |
| 2009/0201936 A1 | 8/2009 | Dumet et al. .................. 370/401 |
| 2009/0235246 A1 | 9/2009 | Seal et al. ....................... 717/173 |
| 2009/0243840 A1 | 10/2009 | Petite et al. .................. 340/539.1 |
| 2009/0245270 A1 | 10/2009 | van Greunen et al. ........ 370/410 |
| 2009/0262642 A1 | 10/2009 | van Greunen et al. ........ 370/216 |
| 2009/0267792 A1 | 10/2009 | Crichlow .................. 340/870.02 |
| 2009/0285124 A1 | 11/2009 | Aguirre et al. ................. 370/255 |
| 2009/0303972 A1 | 12/2009 | Flammer, III et al. ........ 370/338 |
| 2009/0310593 A1 | 12/2009 | Sheynblat et al. ............. 370/350 |
| 2009/0315699 A1 | 12/2009 | Satish et al. ................... 340/533 |
| 2009/0319672 A1 | 12/2009 | Reisman ........................ 709/227 |
| 2009/0320073 A1 | 12/2009 | Reisman ........................ 725/51 |
| 2010/0037069 A1 | 2/2010 | Deierling et al. .............. 713/193 |
| 2010/0037293 A1 | 2/2010 | St. Johns et al. .................. 726/2 |
| 2010/0040042 A1 | 2/2010 | van Greunen et al. ........ 370/350 |
| 2010/0060259 A1 | 3/2010 | Vaswani et al. ................ 324/86 |
| 2010/0061272 A1 | 3/2010 | Veillette ........................ 370/254 |
| 2010/0061350 A1 | 3/2010 | Flammer, III ................. 370/338 |
| 2010/0073193 A1 | 3/2010 | Flammer, III ............ 340/870.11 |
| 2010/0074176 A1 | 3/2010 | Flammer, III et al. ........ 370/328 |
| 2010/0074304 A1 | 3/2010 | Flammer, III ................. 375/134 |
| 2010/0138660 A1 | 6/2010 | Haynes et al. ................. 713/171 |
| 2010/0238917 A1 | 9/2010 | Silverman et al. ............. 370/350 |
| 2011/0066297 A1 | 3/2011 | Saberi et al. ................... 700/287 |

FOREIGN PATENT DOCUMENTS

| | | | | |
|---|---|---|---|---|
| EP | 0 812 502 B1 | 8/2004 | ............ H04L 12/28 |
| EP | 0 740 873 B1 | 12/2005 | ............ H04L 12/44 |
| JP | 10-070774 | 3/1998 | ............ H04Q 5/00 |
| JP | 10-135965 | 5/1998 | ............ H04L 12/28 |
| WO | WO 95/12942 | 5/1995 | ............ H04L 12/44 |
| WO | WO 96/10307 | 4/1996 | ............ H04L 12/28 |
| WO | WO 96/10307 A1 | 4/1996 | ............ H04L 12/28 |
| WO | WO 00/54237 | 9/2000 | ............ G08B 23/00 |
| WO | 0126334 A2 | 4/2001 | |
| WO | WO 01/26334 A2 | 4/2001 | ............ H04L 29/06 |
| WO | WO 01/55865 A1 | 8/2001 | ............ G06F 13/00 |
| WO | WO 03/015452 | 2/2003 | ............ H04Q 9/00 |
| WO | WO 2005/091303 | 9/2005 | ............ G06F 9/445 |
| WO | WO 2006/059195 | 6/2006 | ............ G05D 3/12 |
| WO | WO 2007/015822 | 8/2007 | ............ H04L 12/28 |
| WO | WO 2007/132473 | 11/2007 | ............ G08C 17/00 |
| WO | 2008033287 A2 | 3/2008 | |
| WO | 2008033514 A2 | 3/2008 | |
| WO | WO 2008/027457 | 3/2008 | ............ G08B 23/00 |
| WO | WO 2008/033287 A2 | 3/2008 | ............ G08B 23/00 |
| WO | WO 2008/033514 A2 | 3/2008 | ............ G08B 25/00 |
| WO | WO 2008/038072 | 4/2008 | ............ H04Q 7/24 |
| WO | 2008092268 A1 | 7/2008 | |
| WO | WO 2008/092268 A1 | 8/2008 | ............ G01D 7/06 |
| WO | WO 2009/067251 | 5/2009 | ............ G08C 19/00 |

OTHER PUBLICATIONS

Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987).

Nachum Shacham & Janet D. Tornow, Future Directions in Packet Radio Technology, Proc. of the IEEE Infocom 1985 at 93 (Mar. 1985). 17 pp.

John Jubin & Janet D. Tornow, The DARPA Packet Radio Network Protocols, Proc. of the IEEE, vol. 75, No. 1 at 21 (Jan. 1987).

(56) References Cited

OTHER PUBLICATIONS

John Jubin, Current Packet Radio Network Protocols, Proc. of the IEEE Infocom1985 at 86 (Mar. 1985), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), 18 pp.
David B. Johnson, Mobile Host Internetworking Using IP Loose Source Routing, Carnegie Mellon University CMU-CS-93-128, DARPA Order No. 7330 (Feb. 1993), 18 pp.
Daniel M. Frank, Transmission of IP Datagrams Over NET/ROM Networks, Proc. of the ARRL 7th Computer Networking Conference 1988 at 65 (Oct. 1988), 6 pp.
Robert E. Kahn, et al., Advances in Packet Radio Technology, Proc. of the IEEE, vol. 66, No. 11, pp. 1468-1496 (Nov. 1978).
Clifford A. Lynch & Edwin B. Brownrigg, Packet Radio Networks, Bergamon Press, 259-74 (1987).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), 6 pp.
Nachum Shacham & Jil Westcott, Future Directions in Packet Radio Architectures and Protocols, Proc. of the IEEE, vol. 75, No. 1 at 83 (Jan. 1987), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p. 713-27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep. 1986, 17 pp.
John F. Shoch and Lawrence Stewart, Interconnecting Local Networks via the Packet Radio Network, Sixth Data Communications Symposium, Nov. 1979, pp. 153-158.
J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.
Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.
Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE INFOCOM '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., *Reliability of Packet Switching Broadcast Radio Networks*, IEEE Transactions on Circuits and Systems, vol. Cas-23, No. 12, p. 806-13 ,Dec. 1976.
Kenneth Brayer, Implementation and Performance of Survivable Computer Communication with Autonomous Decentralized Control, IEEE Communications Magazine, p. 34-41, Jul. 1983.
Weidong Chen and Eric Lin, *Route Optimization and Locations Updates for Mobile Hosts*, Proceedings of the 16$^{th}$ ICDCS, p. 319-326, 1996.
Daniel Cohen, Jonathan B. Postel, and Raphael Rom, *Addressing and Routing in a Local Wireless Network*, IEEE INFOCOM 1992, p. 5A.3.1-7.
Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009).
Jonathan J. Hahn and David M. Stolle, *Packet Radio Network Routing Algorithms: A Survey*, IEEE Communications Magazine, vol. 22, No. 11, p. 41-7, Nov. 1984.
David A. Hall, *Tactical Internet System Architecture for the Task Force XXI*, IEEE 1996, p. 219-30.
Robert Hinden and Alan Sheltzer, *The DARPA Internet Gateway*, DARPA RFC 823, Sep. 1982, 45 pp.
Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.
David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.
David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.
Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.
Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.
Charles E. Perkins and Pravin Bhagwat, *A Mobile Networking System Based on Internet Protocol*, IEEE Personal Communications, First Quarter 1994, IEEE 1994, p. 32-41.
Richard Schulman, Richard Snyder, and Larry J. Williams, *SINCGARS Internet Controller—Heart of the Digitized Battlefield*, Proceedings of the 1996 Tactical Communications Conference, Apr. 30-May 2, 1996, Fort Wayne, Indiana, p. 417-21.
Nachum Shacham and Earl J. Craighill, *Dynamic Routing for Real-Time Data Transport in Packet Radio Networks*, Proceedings of INFOCOM 1982, IEEE 1982, p. 152-58.
R. Lee Hamilton, Jr. and Hsien-Chuen Yu, *Optimal Routing in Multihop Packet Radio Networks*, IEEE 1990, p. 389-96.
Carl A. Sunshine, *Addressing Problems in Multi-Network Systems*, Proceedings of INFOCOM 1982, IEEE 1982, p. 12-18.
J.J. Garcia-Luna-Aceves, *Routing Management in Very Large-Scale Networks*, North-Holland, Future Generations Computer Systems 4, 1988, pp. 81-93.
J.J. Garcia-Luna-Aceves, *A Minimum-hop Routing Algorithm Based on Distributed Information*, North-Holland, Computer Networks and ISDN Systems 16, 1988/1989, p. 367-382.

(56) References Cited

OTHER PUBLICATIONS

D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.

Jens Zander and Robert Forchheimer, *The SOFTNET Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

International Search Report and Written Opinion for Application No. PCT/US2011/060694, dated Apr. 9, 2012, 10 pp.

International Search Report and Written Opinion for Application No. PCT/US2011/049227, dated Jan. 31, 2012, 9 pp.

International Search Report and Written Opinion for Application No. PCT/US12/22334, dated Apr. 9, 2012, 9 pp.

International Search Report and Written Opinion for Application No. PCT/US11/56620, dated Mar. 13, 2012, 8 pp.

Supplementary European Search Report for Application No. EP 08 84 2449, dated Nov. 29, 2011, 5 pp.

Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.

Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.

Supplementary European Search Report for Application No. EP 09 81 1849, dated Dec. 13, 2011, 9 pp.

Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.

International Search Report and Written Opinion for Application No. PCT/US2011/049277, dated Jan. 31, 2012, 9 pp.

International Search Report and Written Opinion for Application No. PCT/US11/21167, dated Mar. 21, 2012, 8 pp.

"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.

"ZigBee Smart Energy Profile Specification," ZigBee Profile: 0x0109, Revision 15, Dec. 1, 2008, Document 075345r15 (SEP Document), 244 pp.

Edison Electric Institute (EEI), "Uniform Business Practices for Unbundled Electricity Metering, vol. Two," Dec. 5, 2000, 196 pp., www.naesb.org/pdf/ubp120500.pdf.

"ZigBee Smart Energy Profile Specification," ZigBee Profile: 0x0109, Revision 16, Version 1.1, Document 075356r16ZB, 332 pp., Mar. 23, 2011.

"ZigBee Over-the-Air Upgrading Cluster," ZigBee Alliance, Document 095264r18, Revision 18, Version 1.0, 63 pp., Mar. 14, 2010.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.

"ZigBee Cluster Library Specification," ZigBee Alliance, Document 075123r02ZB, 420 pp., May 29, 2008.

Liu, Ryan, et al., "A Survey of PEV Impacts on Electric Utilities," *EEE PES Innovative Smart Grid Technologies Conference*, Anaheim, California, 8 pp., Jan. 17-19, 2011.

"Utility/Lab Workshop on PV Technology and Systems," DTE Energy DER Technology Adoption, DEW Analysis of Renewable, PEV & Storage, Tempe, Arizona, 36 pp., Nov. 8-9, 2010.

"Network Device: Gateway Specification," ZigBee Alliance, ZigBee Document 075468r35, Revision 35, Version No. 1.0, 301 pp., Mar. 23, 2011.

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

International Search Report and Written Opinion for Application No. PCT/US08/13025, dated Jan. 13, 2009, 7 pp.

International Search Report and Written Opinion for Application No. PCT/US08/13020, dated Jan. 9, 2009, 8 pp.

International Search Report and Written Opinion for Application No. PCT/US08/13021, dated Jan. 15, 2009, 11 pp.

Reexamination Application No. 90/008,011, filed Jul. 24, 2006, 75 pp.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13032, dated May 12, 2009, 14 pp.

International Search Report and Written Opinion for Application No. PCT/US08/13026, dated Feb. 24, 2009, 9 pp.

International Search Report and Written Opinion for Application No. PCT/US08/13029, dated Feb. 2, 2009, 8 pp.

Hydro One Networks, Inc., Request for Proposal for Smart Metering Services, 16 pp., Mar. 4, 2005.

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "Bahama: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

(56) References Cited

OTHER PUBLICATIONS

Lee, David J. Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Privat, G., "A System-Architecture Viewpoint on Smart Networked Devices," Microelectronic Engineering, vol. 54, Nos. 1-2, pp. 193-197, Dec. 2000.

Jonsson, U., et al., "MIPMANET—Mobile IP for Mobile Ad Hoc Networks," MobiHOC 2000, First Annual Workshop on Mobile and Ad Hoc Networking and Computing, pp. 75-85 (12 pp. with Abstract), 2000.

Kapoor, R., et al., "Multimedia Support Over Bluetooth Piconets," First Workshop on Wireless Mobile Internet, pp. 50-55, Jul. 2001.

Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

Leis, John, "TCP/IP Protocol Family," pp. 1 and 42-43, Apr. 3, 2006.

Supplementary European Search Report for Application No. EP 08 85 1869, dated Dec. 30, 2010, 7 pp.

International Search Report and Written Opinion for Application No. PCT/US10/26956, dated May 19, 2010, 2 pp.

Supplementary European Search Report for Application No. EP 08 85 1132, dated Dec. 6, 2010, 9 pp.

Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).

Levis Stanford University, J. P. Vasseur, Cisco Systems, et al., "Overview of Existing Routing Protocols for Low Power and Lossy Networks," draft-levis-rl2n-overview-protocols-02.txt, IEFT Standard-Working-Draft, Internet Engineering Task Force, IETF, Ch, No. 2, Nov. 17, 2007 (XP015054252) (ISSN: 0000-0004).

Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, CH, No. 1, Jul. 7, 2007 (XP015050851) (ISSN: 000-0004).

Perkins, C. E., et al., "Ad Hoc On-Demand Distance Vector (AODV) Routing," Network Working Group Internet Draft, XX, Nov. 9, 2001 (XP002950167).

Postel, J., "RFC 793 Transmission Control Protocol," Sep. 1981 [retrieved on Jan. 1, 2007], Retrieved From the Internet: http://www.ietf.org/rfc/rfc0793.txt.

Supplementary European Search Report for Application No. EP 08 85 1927, dated Dec. 22, 2010, 10 pp.

Younis, M., et al., "Energy-Aware Routing in Cluster-Based Sensor Networks," Modeling, Analysis and Simulation of Computer and Telecommunications Systems, $10^{th}$ IEEE Proceedings on Mascots, Oct. 11-16, 2002, Piscataway, NJ (XP010624424) (ISNB: 978-0-7695-1840-4).

Supplementary European Search Report for Application No. EP 08 85 3052, dated Mar. 18, 2011, 10 pp.

Supplementary European Search Report for Application No. EP 08 85 1560, dated Mar. 24, 2011, 9 pp.

Supplementary European Search Report for Application No. EP 08 85 2992, dated Mar. 23, 2011, 6 pp.

"AMRON Technologies Successfully Deploys Advanced Metering Solution for C&I Customers Using Bluetooth" [online], Sep. 2, 2004 [retrieved on Jan. 2, 2009], 3pp. Retrieved from the Internet: http://www.techweb.com/showpressrelease?articled=X234101&CompanyId=3.

"AMRON Meter Management System" [online], [retrieved on May 12, 2005], 41pp., Retrieved from the Internet: http//www.amronm5.com/products/.

Broch, Josh, et al., "A Performance Comparison of Multi-Hop Wireless Ad Hoc Network Routing Protocols," Proceedings of the Fourth Annual ACM/IEEE International Conference in Mobile Computing and Networking (MobiCom '98), Dallas, Texas, 13 pp., Oct. 25-30, 1998.

Broch, Josh, et al., The Dynamic Source Routing Protocol for Mobile Ad Hoc Networks [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," Electrical Engineering and Computer Science Department, University of California, Berkeley, 12 pp., 1996.

Johnson, David B., "Routing in Ad Hoc Networks of Mobile Hosts," IEEE, pp. 158-163, 1995.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009 7 pp.

International Search Report and Written Opinion for Application No. PCT/US08/13018, dated Jan. 30, 2009, 9 pp.

International Search Report and Written Opinion for Application No. PCT/US08/13020, dated Jan. 30, 2009,8 pp.

International Search Report and Written Opinion for Application No. PCT/US08/13028, dated Jan. 15, 2009, 9 pp.

International Search Report and Written Opinion for Application No. PCT/US08/13021 dated Jan. 15, 2009, 11 pp.

International Search Report and Written Opinion for Application No. PCT/US08/13016, dated Jan. 9, 2009, 7 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.

International Search Report and Written Opinion for Application No. PCT/US08/12161, dated Mar. 2, 2009, 13pp.

International Search Report and Written Opinion for Application No. PCT/US08/13017, dated Mar. 18, 2009, 11pp.

International Search Report and Written Opinion for Application No. PCT/US08/13032, dated May 12, 2009, 14pp.

International Search Report and Written Opinion for Application No. PCT/US08/13026, dated Feb. 24, 2009, 9pp.

International Search Report and Written Opinion for Application No. PCT/US08/13029, dated Feb. 2, 2009, 8pp.

ENERGY USE CONTROL SYSTEM AND METHOD

CROSS-REFERENCE TO RELATED APPLICATIONS

This application is a continuation of U.S. patent application Ser. No. 12/275,239, filed Nov. 21, 2008, entitled "Energy Use Control System and Method," which claims the benefit of priority to the following U.S. Provisional Patent Applications, all of which are incorporated herein by reference in their entirety:
Ser. No. 60/989,957 entitled "Point-to-Point Communication within a Mesh Network", filed Nov. 25, 2007;
Ser. No. 60/989,967 entitled "Efficient And Compact Transport Layer And Model For An Advanced Metering Infrastructure (AMI) Network," filed Nov. 25, 2007;
Ser. No. 60/989,958 entitled "Creating And Managing A Mesh Network Including Network Association," filed Nov. 25, 2007;
Ser. No. 60/989,964 entitled "Route Optimization Within A Mesh Network," filed Nov. 25, 2007;
Ser. No. 60/989,965, entitled "ENERGY USE CONTROL SYSTEM AND METHOD" filed on Dec. 5, 2007;
Ser. No. 60/989,950 entitled "Application Layer Device Agnostic Collector Utilizing ANSI C12.22," filed Nov. 25, 2007;
Ser. No. 60/989,953 entitled "System And Method For Real Time Event Report Generation Between Nodes And Head End Server In A Meter Reading Network Including From Smart And Dumb Meters," filed Nov. 25, 2007;
Ser. No. 60/989,975 entitled "System and Method for Network (Mesh) Layer And Application Layer Architecture And Processes," filed Nov. 25, 2007;
Ser. No. 60/989,959 entitled "Tree Routing Within a Mesh Network," filed Nov. 25, 2007;
Ser. No. 60/989,961 entitled "Source Routing Within a Mesh Network," filed Nov. 25, 2007;
Ser. No. 60/989,962 entitled "Creating and Managing a Mesh Network," filed Nov. 25, 2007;
Ser. No. 60/989,951 entitled "Network Node And Collector Architecture For Communicating Data And Method Of Communications," filed Nov. 25, 2007;
Ser. No. 60/989,955 entitled "System And Method For Recovering From Head End Data Loss And Data Collector Failure In An Automated Meter Reading Infrastructure," filed Nov. 25, 2007;
Ser. No. 60/989,952 entitled "System And Method For Assigning Checkpoints To A Plurality Of Network Nodes In Communication With A Device Agnostic Data Collector," filed Nov. 25, 2007;
Ser. No. 60/989,954 entitled "System And Method For Synchronizing Data In An Automated Meter Reading Infrastructure," filed Nov. 25, 2007;
Ser. No. 60/992,312 entitled "Mesh Network Broadcast," filed Dec. 4, 2007;
Ser. No. 60/992,313 entitled "Multi Tree Mesh Networks", filed Dec. 4, 2007;
Ser. No. 60/992,315 entitled "Mesh Routing Within a Mesh Network," filed Dec. 4, 2007;
Ser. No. 61/025,279 entitled "Point-to-Point Communication within a Mesh Network", filed Jan. 31, 2008;
Ser. No. 61/025,270 entitled "Application Layer Device Agnostic Collector Utilizing Standardized Utility Metering Protocol Such As ANSI C12.22," filed Jan. 31, 2008;
Ser. No. 61/025,276 entitled "System And Method For Real-Time Event Report Generation Between Nodes And Head End Server In A Meter Reading Network Including Form Smart And Dumb Meters," filed Jan. 31, 2008;
Ser. No. 61/025,282 entitled "Method And System for Creating And Managing Association And Balancing Of A Mesh Device In A Mesh Network," filed Jan. 31, 2008;
Ser. No. 61/025,271 entitled "Method And System for Creating And Managing Association And Balancing Of A Mesh Device In A Mesh Network," filed Jan. 31, 2008;
Ser. No. 61/025,287 entitled "System And Method For Operating Mesh Devices In Multi-Tree Overlapping Mesh Networks", filed Jan. 31, 2008;
Ser. No. 61/025,278 entitled "System And Method For Recovering From Head End Data Loss And Data Collector Failure In An Automated Meter Reading Infrastructure," filed Jan. 31, 2008;
Ser. No. 61/025,273 entitled "System And Method For Assigning Checkpoints to A Plurality Of Network Nodes In Communication With A Device-Agnostic Data Collector," filed Jan. 31, 2008;
Ser. No. 61/025,277 entitled "System And Method For Synchronizing Data In An Automated Meter Reading Infrastructure," filed Jan. 31, 2008;
Ser. No. 61/026,097 entitled "Energy Use Control System And Method," filed Feb. 8, 2008; and
Ser. No. 61/094,116 entitled "Message Formats and Processes for Communication Across a Mesh Network," filed Sep. 4, 2008.
This application hereby references and incorporates by reference each of the following U.S. patent applications:
Ser. No. 12/275,236 entitled "Point-to-Point Communication within a Mesh Network", filed Nov. 21, 2008;
Ser. No. 12/275,305 entitled "Efficient And Compact Transport Layer And Model For An Advanced Metering Infrastructure (AMI) Network," filed Nov. 21, 2008;
Ser. No. 12/275,238 entitled "Communication and Message Route Optimization and Messaging in a Mesh Network," filed Nov. 21, 2008, now U.S. Pat. No. 8,144,596;
Ser. No. 12/275,242 entitled "Collector Device and System Utilizing Standardized Utility Metering Protocol," filed Nov. 21, 2008;
Ser. No. 12/275,252 entitled "Method and System for Creating and Managing Association and Balancing of a Mesh Device in a Mesh Network," filed Nov. 21, 2008; and
Ser. No. 12/275,257 entitled "System And Method For Operating Mesh Devices In Multi-Tree Overlapping Mesh Networks", filed Nov. 21, 2008.

FIELD OF THE INVENTION

This invention pertains to systems, devices, and methods for controlling power or energy use, such as, for example, in an Automated Metering Infrastructure.

BACKGROUND

Use of a utility such as water, electricity, natural gas or other utility or energy is conventionally by the demand of a user. The user may use as much or as little as is desired, paying as the energy is used, and perhaps paying at a prevailing market rate which may vary according to a schedule or current demand. This may be undesirable because the price of a utility and especially energy may fluctuate according to schedule and/or demand and it may be that certain times are more cost effective. This may be true from either the standpoint of a control device or the standpoint of a user if the user is exposed to knowledge of wholesale pricing of the energy.

Where a user is exposed to costs, the user may find it undesirable to, for example, consume a resource or operate an appliance such as dishwasher swimming pool filter or other appliance at peak pricing. It may be more cost effective to operate the dishwasher to clean dinner or the day's dishes at, for example, 3 am because of a low demand and associated lower energy pricing where clean dishes are still available in the morning. The same may be true for operating other energy consuming appliances and for off-peak charging of electric vehicle batteries from a residential source or when such charging such vehicle batteries becomes more widespread.

Even if some users are willing to be subject to some or full control of their utility or energy use, other users may not be willing to turn over full control. Such users may have a desire to allow a control device to have influence over their utility or energy use decisions, but may not want the centralized control to have complete control.

Other users may desire that a centralized management system have no control over their utility or energy use, but may still be willing to receive messages pertaining to the cost effectiveness of energy usage at various times. They would then be in a better position to make their own informed decisions relative to utility or energy usage.

What is needed is a system and method for controlling utility and/or energy usage so that energy consumption is, at times, limited.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above described problems have been reduced or eliminated, while other embodiments are directed to other improvements.

In one non-limiting aspect there may be provided a system comprising: a request interface receiving an instruction to control energy use; a scheduler coupled to the request interface identifying one or more devices to provide commands to control energy use; and a command provider creating messages for the one or more identified devices to limit energy use.

In another non-limiting aspect there may be provided a method comprising: receiving a request to control energy use; providing the request to a scheduler; creating a message for a device subject to the request; and providing the request to the device.

In another non-limiting aspect there may be provided a method comprising: receiving a request to control energy use; authenticating the request to control energy use; removing message headers; and providing a table request.

In another non-limiting aspect there may be provided a device comprising: a radio coupled to a communications logic unit; an external energy using component coupled to the communications logic unit; and a memory storing tables, the memory including instructions for disabling the external energy using component coupled to the communications logic unit.

In another non-limiting aspect there may be provided a system comprising: means for receiving an instruction to disable an external energy using device; means for generating a message to the external energy using device to instruct the external energy using device to cease energy consumption; and means for providing the message to the external energy using device.

In another non-limiting aspect there may be provided a computer program stored in a computer readable form for execution in a processor and a processor coupled memory to implement a method comprising: receiving a request to control energy use; providing the request to a scheduler; creating a message for a device subject to the request; and providing the request to the device.

In another non-limiting aspect there may be provided a computer program stored in a computer readable form for execution in a processor and a processor coupled memory to implement a method comprising: receiving a request to control energy use; authenticating the request to control energy use; removing message headers; and providing a table request.

This Summary introduces concepts in a simplified form that are described more fully below in the Detailed Description. This Summary is not intended to identify key or essential features of the claimed subject matter, nor is it intended to be used to limit the scope of the claimed subject matter.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
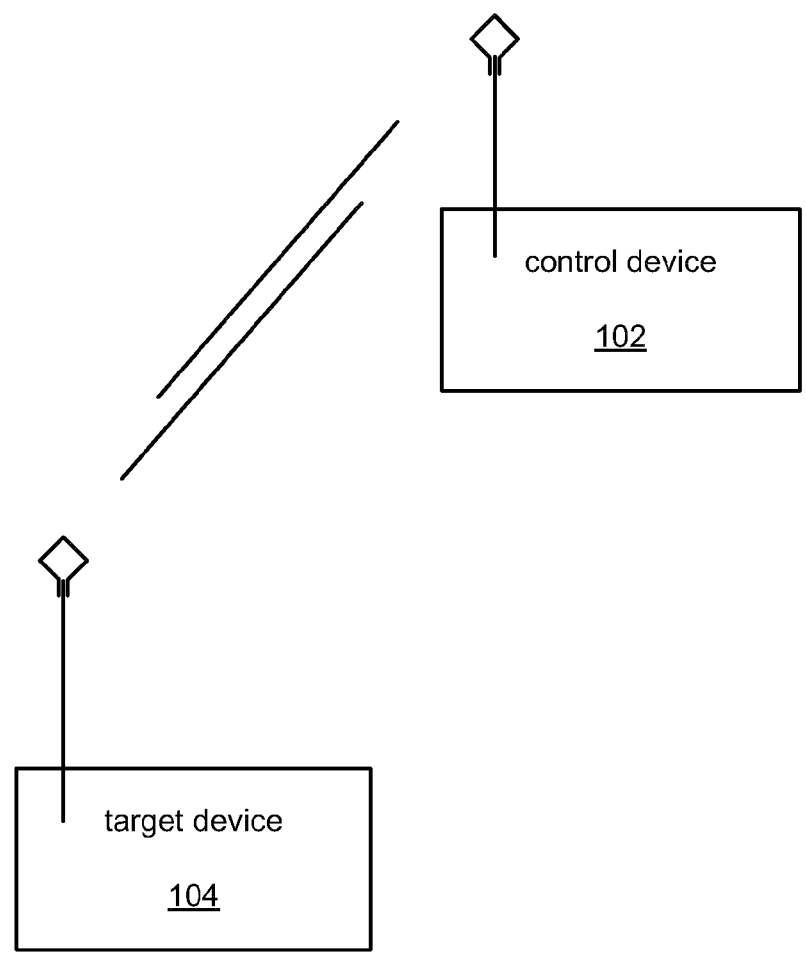
FIG. 1 depicts a diagram of an exemplary system including a control device and a target device.

FIG. 1 depicts a diagram of an exemplary system 100 including a control device 102 and a target device 104.

The control device 102 could be a head end unit, or one of many distributed control devices such as a network gate. For example, the gate may be a NAN-WAN gate (neighborhood area network—wide area network gate). The control device 102 may include a radio. The control device 102 may communicate by wired or wireless communications.

The target device 104 may be any device that consumes, controls, or otherwise uses a utility such as energy. For brevity of description, references to energy will imply a reference to other utilities and is used because energy is a primary utility to be consumed, controlled, or otherwise used in this manner. By way of example, and not limitation, an energy using device could be an electricity meter, an electrically operated dishwasher, an electric pool pump, a high wattage or amperage switch or circuit breaker controlling electrical energy for a home, or any other device that consumes, controls, or otherwise uses energy. The device may optionally include non-volatile storage for recording energy consumption readings. The energy using device or energy consuming device may be a part of the system or may be a device that is external to the system but connected or coupled to it.

The target device 104 may include a radio and a communications logic board. The target device 104 may be a demand response device, a load control device, or any device known or convenient. The radio may communicate using any known or convenient radio communications protocol. In a non-limiting example, the American National Standards Institute (ANSI) C12.22 standard in effect as of the date of filing of this application or an enhancement or extension of this standard governs the communications.

Figure 2:
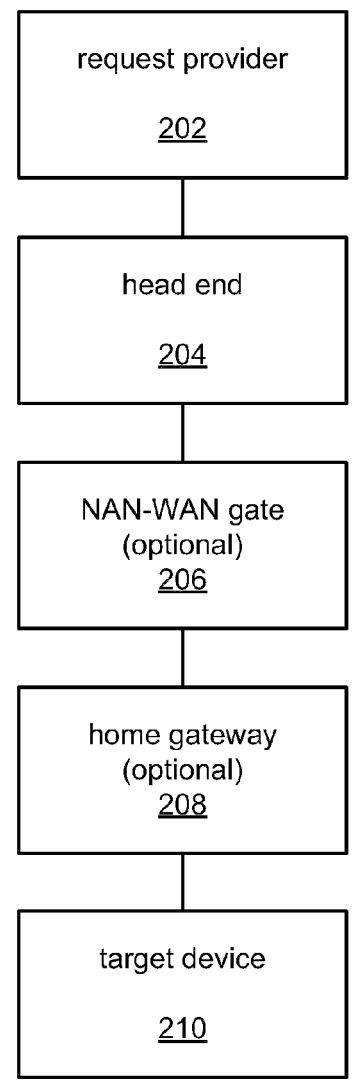
FIG. 2 depicts a diagram of an exemplary system for controlling energy use.

FIG. 2 depicts a diagram of an exemplary system 200 for controlling energy use. FIG. 2 includes request provider 202, head end 204, neighborhood area network to wide area network (NAN-WAN) gate 206, a gateway such as home gateway 208, and target device 210.

The request provider 202 may be a web based interface, an interface based on the simple object access protocol (SOAP), or any known or convenient interface or manner of communicating a request to control energy use.

The head end 204 may be a server, cluster of servers, or other known or convenient request processing system. As used herein, a server may be a software application executing as one or more instances on one or more hardware units. A plurality of servers may include one or more hardware units executing one or more instances of a software application. Each hardware unit may include a processor and memory storing one or more instances of the software application providing instructions for execution by the processor.

The optional NAN-WAN gate 206 may be a mesh gate, multi radio device or other device able to communicate on a mesh network as well as a wide area network such as one communicating via TCP-IP or another known or convenient communications protocol. In a non-limiting example, the NAN-WAN gate provides communications via multiple protocol stacks, including a stack dedicated to the Trilliant mesh network, and a stack dedicated to wide area communications such as the TCP/IP stack. A Trilliant mesh network may for example be or conform to networks and network architectures of Trilliant Networks, Inc. or Redwood City, Calif.

The optional home gateway 208 may include multiple radios and processing logic designed for a ZigBee network as well as a mesh network. The processing logic of the home gateway 206 may enable translation of messages from the Trilliant mesh network to a ZigBee network. A ZigBee network is a network that complies with the ZigBee Alliance and uses ZigBee features and protocols, as well as to enhancements and extensions thereto. ZigBee protocols and standards as promulgated at the date of filing of this patent application are hereby incorporated by reference.

The ZigBee Alliance is an association of companies working to enable reliable, cost-effective, low-power, wirelessly networked, monitoring and control products based on an open global standard. The ZigBee Alliance focuses on defining the network, security, and application software layers, providing interoperability and conformance testing specifications, promoting the ZigBee brand globally to build market awareness, and managing the evolution of the technology. Further information about the ZigBee Alliance may be obtained at www-.zigbee.org/en/about/.

The target device 210 may be an energy using device such as a load control device, or demand response device. A load control device is a device which allows a user to override centralized control when a command is issued to cease energy consumption at the load control device. A demand response device may receive a command to cease energy use and a user may not usually be able to override the command, though exceptions may be permitted.

In the example of FIG. 2, in operation, the request provider 202 provides a request to the head end 204 to cause one or more devices to cease energy use for a duration of time to begin at a specified time. The request may be varied, and for a group of target devices, the request may or may not specify individual devices; optionally a class of target devices may be specified and the head end 204 may determine individual devices to target. The head end or head end server 204 receives the request from the request provider 202 and identifies one or more target devices 210 using the request. One or more messages are created including a message instructing the target device 210 to cease energy consumption. Absent either an optional NAN-WAN gate 206, and a home gateway 208, the message is provided directly to the target device 210.

Where a NAN-WAN gate 206 provides connectivity between the head end 204 and the target device 210, the message is provided to the NAN-WAN gate 206 via a wide area communications protocol, and the NAN-WAN gate 206 provides the message to the target device 210.

Where a home gateway 208 provides connectivity between the NAN-WAN gate 206 and the target device 210, the home gateway may use a protocol such as the ZigBee protocol or another known or convenient protocol for providing a home area network to provide the message from the NAN-WAN gate 206 to the target device 210.

Figure 3:
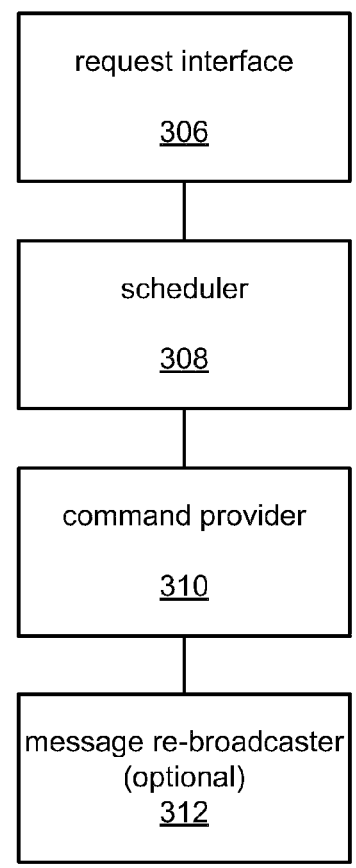
FIG. 3 depicts components included in an exemplary head end system.

FIG. 3 depicts components included in an exemplary head end system 300. FIG. 3 includes request interface 306, scheduler 308, and command provider 310. An message re-broadcaster 312 may optionally be provided.

The request interface 306 may be designed for any known or convenient protocol. In a non-limiting example, the simple object access protocol (SOAP) is used. The protocol may provide the requests to a framework, where a framework may govern communications between devices on a network. Any known or convenient framework may be used, such as for example, a framework available from Trilliant Networks of Redwood City, Calif. Security may be used to protect the contents of requests transferred. In a non-limiting example, a secure hypertext transfer protocol (HTTPS) may be used to provide SOAP protocol requests to the request interface 306 in a secure manner. A web based interface may be used to provide requests, or alternatively a software application may provide requests to the request interface 306.

A request may specify a class of devices to target for a particular energy use control request. Classes may be used to identify devices based on criteria such as the purpose, energy consumption, time of use, or other known or convenient criteria for controlling energy use.

The scheduler 308 may include a message creation engine operable to target one or more devices based on a request. A message may be created for each device to be targeted. The message may specify energy use criteria to a target device to cause the target device to operate or not operate in a particular manner, such as for example, to cease energy use at a specified time and/or for a specified duration of time. In some cases, the target device may be permitted to operate in a standby manner wherein it consumes some minimal energy to maintain settings, stored information, or to be able to wake up and transition to a higher energy consumption mode. For a class of devices the scheduler 308 may create one or more messages.

The command provider 310 may include one or more hardware units executing one or more servers to provide one or more messages to one or more devices. The command provider 310 may access a message created by the scheduler 308 as well as one or more devices. The devices may be accessible via a network such as for example including a wide area network (WAN), optionally a neighborhood area network (NAN), and optionally a home area network (HAN).

The optional message re-broadcaster 312 may include a message replication unit and a target device identification unit. The message replication unit may take an existing message and create a second message targeting a device identified by the target device identification unit. A plurality of messages may be created for a plurality of target devices.

In the example of FIG. 3 in operation, the request interface 306 may receive a request to limit energy use for a class of target devices according to a set of criteria. The scheduler 308 may create one or more messages to control energy consumption of one or more specified devices, one message per device. The command provider 310 may provide each message created to a network for transmission to the target device associated with the message.

In the example of FIG. 3, in operation, the optional message re-broadcaster 312 may be used to identify target devices to which to provide messages. If the message re-broadcaster is used then the scheduler may create one message per message re-broadcaster. A plurality of message re-broadcasters may be used. Advantageously, the scheduler 308 need not create a message for each and every target device, thus distributing work to the message re-broadcaster 312. The message re-broadcaster 312 may create a message for each target device from the message provided to the message re-broadcaster 312.

Figure 4:
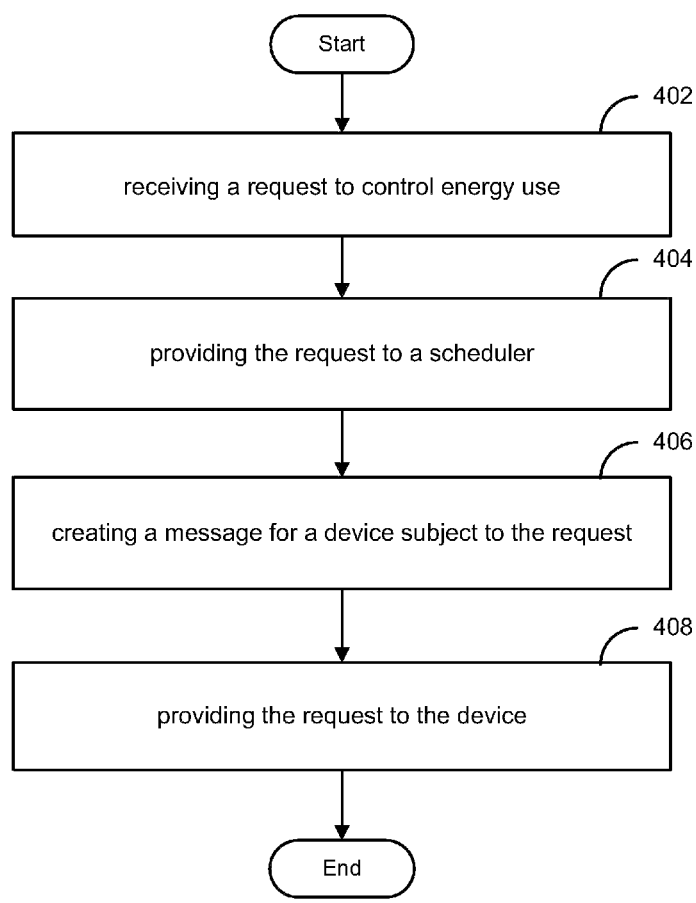
FIG. 4 depicts a flowchart of a non-limiting example of a method for controlling energy consumption of a demand response device.

FIG. 4 depicts a flowchart of a non-limiting example of a method 400 for controlling energy consumption of a demand response device. The method is organized as a sequence of modules or steps in the flowchart. However, it should be understood that these and modules associated with other methods described herein may be reordered for parallel execution or into different sequences of modules.

In the example of FIG. 4, the method starts at module or step 402 with receiving a request to control energy use. This request to control energy use may be partial or complete. A device may be instructed to cease energy consumption entirely. A time and duration may be specified. The request may specify a class of devices, or alternatively a specific device. The request may be received in a secure format via a network. In a non-limiting example, the simple object access protocol (SOAP) is used in conjunction with the secure hypertext transfer protocol (HTTPS) to provide the request.

In the example of FIG. 4, the flowchart continues to module or step 404 with providing the request to the scheduler. The request may be re-transmitted from an interface originally receiving the message to the scheduler via an internal network.

In the example of FIG. 4, the flowchart continues to module or step 406 with creating a message for a device subject to the request. The device may be explicitly identified in the request to control energy use, or alternatively may be identified by criteria out of a pool of devices. In a non-limiting example, device class, time of use, amount of energy used, or other known or convenient criteria may be used.

In the example of FIG. 4, the flowchart continues to module or step 408 with providing the request to the device. The request may be transmitted directly to the device, or may be retransmitted by one or more intermediate devices via one or more networks. Where multiple networks are used multiple protocols may be used requiring translation between the multiple protocols. Having transmitted a message confirming the decrease of energy consumption, the flowchart terminates.

Figure 5:
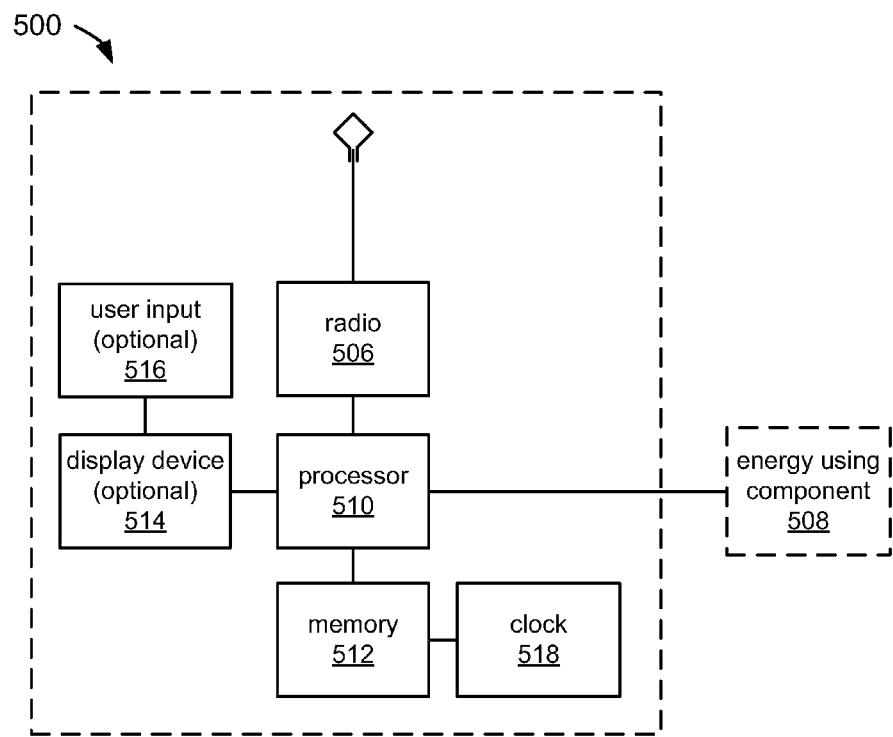
FIG. 5 depicts a diagram of an exemplary energy control device.

FIG. 5 depicts a diagram of an exemplary energy control device 500. The exemplary energy control device depicted in FIG. 5 includes radio 506, energy using component 508, processor 510, memory 512, optional display device 514, and optional user input 516. Energy using component 508 may be external to the energy control device 500, such as a commercial or residential appliance that is connected to or coupled with the energy control device.

The energy control device 500 may be a load control device or a demand response device. The load control device may be instructed to cease energy use, however, a user may override the instruction when desirable. The demand response device may receive a command to cease energy use and a user may not override the command.

The radio 506 may be any known or convenient combination of electronic components, e.g. transistors, resistors, inductors and other known or convenient electronic components to perform a radio or communication function. The radio 506 may operate using one or more protocols. In a non-limiting example, a mesh network protocol may be used by the radio 506 to communicate with other devices coupled or coupleable to the mesh network.

The energy using component 508 may implement the function of the device; in a non-limiting example, the energy using component 508 could be a dishwasher, a pool pump, a light, or any known or convenient device using electricity. The energy using component may be part of the system but is frequently an external component separate from the system and coupled to the system in a manner that its energy use may be controlled by the system.

The processor 510 may execute instructions found or stored in the memory 512 for communication, enabling and disabling the energy using component 508, and performing other known or convenient tasks. The clock 518 may provide a current time for the energy using device.

The memory 512 may include data structure such as a table structure formatted to a format, such as for example to the ANSI C12.19 format. A table may be specified for instructions to control energy use. The ANSI C12.19 table format is described in ANSI C12 documents and standards that are in effect as of the date of filing of this patent application, and which documents and standards are herein incorporated by reference.

The optional display device 514 may be coupled to an optional user input 516 for displaying information about the status of the energy using component 508. The optional display device 514 may generate or produce messages or warnings that the energy using component 508 will be disabled. For a load control device, the user input 516 may allow the user to prevent the disabling of the energy using component 508.

In the example of FIG. 5 in operation, the radio receives a message instructing the processor 510 to disable the energy.

The message may be provided according to the table structure for the ANSI C12.19 format. In a non-limiting example, the energy using component 508 is to be disabled between specified times, such as between 5 pm and 10 pm. At the time specified by the clock 518, instructions stored in the memory 512 executed by the processor 510 cause energy using component 508 to cease energy consumption at the specified stop time (e.g., 5 pm) and to prevent the energy consumption from resuming until after the specified resume time (e.g., 10 pm). If the energy control device is a demand response device, the instruction may not be overridden; however, if the energy control device is a load control device, the instruction may be overridden by a command through the optional user input 516. Emergency override may optionally be provided for demand response device.

Figure 6:
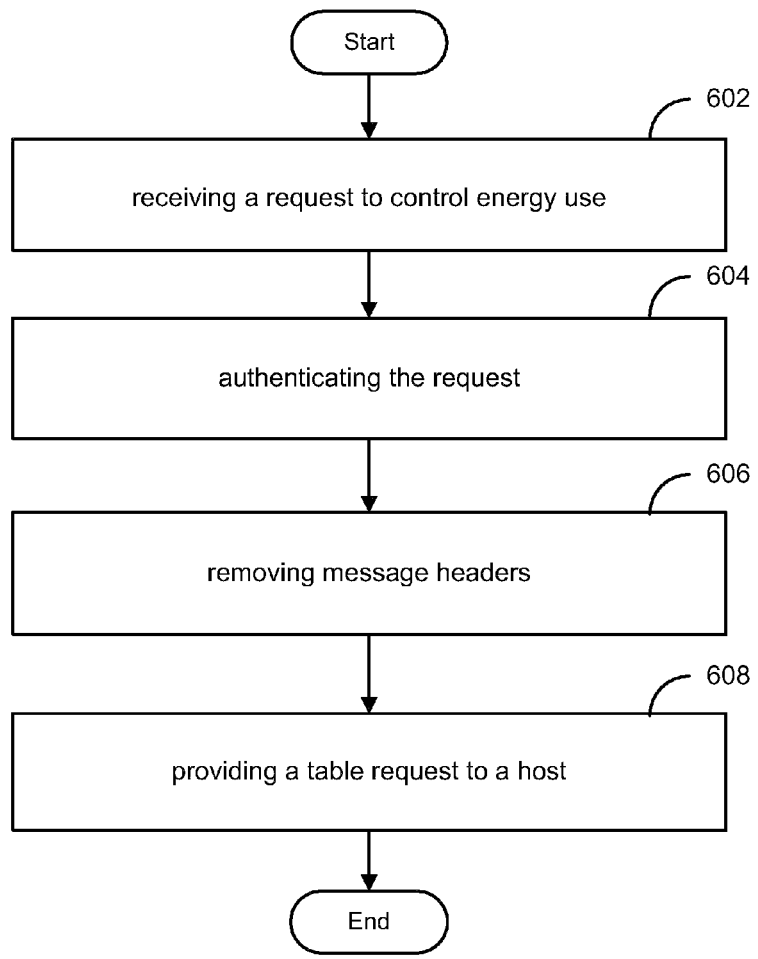
FIG. 6 depicts a flowchart of a non-limiting example of a method for controlling energy consumption.

FIG. 6 depicts a flowchart of a non-limiting example of a method 600 for controlling energy consumption. The method 600 is organized as a sequence of modules or steps in the flowchart. However, it should be understood that these and modules associated with other methods described herein may be reordered for parallel execution or into different sequences of modules.

In the example of FIG. 6, the method starts at module or step 602 with a demand response device or load control device receiving a request to control energy use. The request may be received via a radio, or via a wired connection. The request may be structured as a table conforming to the ANSI C12.19 format.

In the example of FIG. 6, the method continues to module or step 604 with authenticating the request. The request may be encrypted, such as by using a key. Using the key, the device may decrypt the message. An inability to decrypt the message because of an incorrect key may indicate that the request was not designed for the device receiving the request.

In the example of FIG. 6, the method continues to module 606 with removing message headers. Separating the request from the headers may yield the request itself.

In the example of FIG. 6, the method continues to module or step 608 with providing a table request to a host. The table request may be stored in memory according to a table structure for the device. Storing the request in memory may make the request accessible to a processor for further action.

Figure 7:
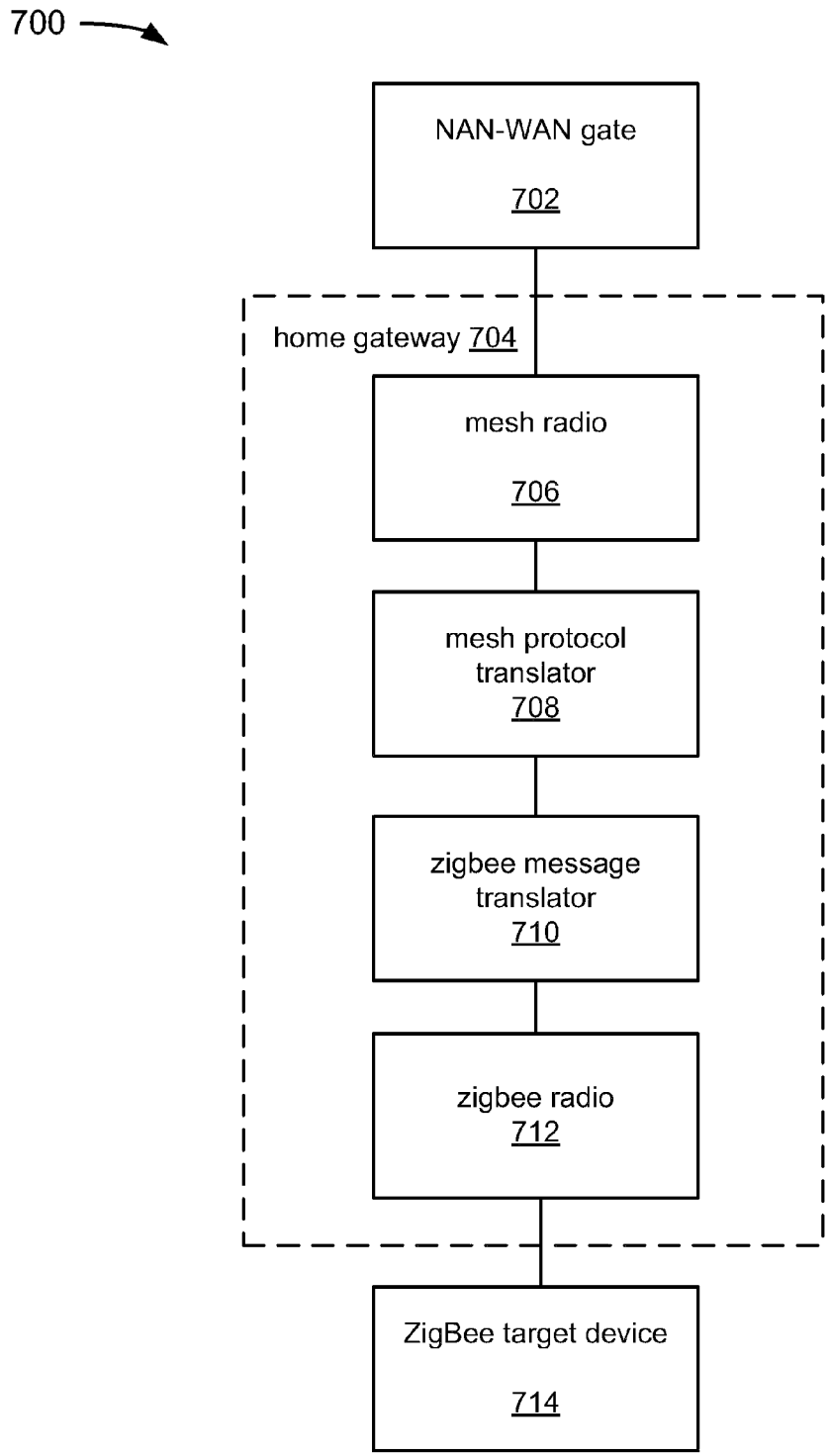
FIG. 7 depicts a system for providing a message from a NAN-WAN gate to a target device on a home area network (HAN).

FIG. 7 depicts a system 700 for providing a message from a NAN-WAN gate to a target device on a home area network (HAN). FIG. 7 includes NAN-WAN gate 702, home gateway 704, and ZigBee target device 714. The NAN-WAN gate 702 may communicate on a wide area network and via a mesh network. Additional information about the ZigBee device, message translator and format is described in the Zigbee Smart Energy Profile Specification which is incorporated herein by reference, provided by the Zigbee Standards Organization and available through the world-wide web.

The home gateway 704 includes a mesh radio 706, a mesh protocol translator 708, and a ZigBee message translator 710.

The mesh radio 706 may communicate over a mesh network with the NAN-WAN gate 702. The mesh radio 706 may receive messages intended for the ZigBee target device 714. The mesh protocol translator 708 may receive a message formatted for the mesh protocol and reduce it to an intermediate format. In a non-limiting example, the mesh protocol translator 708 converts the mesh format to a plain text formatted table structure.

The ZigBee message translator 710 may receive an intermediate format and translate the format to the ZigBee format. In a non-limiting example a message in plain text is formatted as a message in the ZigBee format. The ZigBee radio 712 provides messages to devices in range of the ZigBee radio 712.

The ZigBee target device 714, may be any energy using device able to receive messages via the ZigBee protocol. The ZigBee target device 714 may be one of a plurality of ZigBee devices on a home area network (HAN).

In the example of FIG. 7 in operation, the NAN-WAN gate 702 provides a message to the mesh radio 706. The mesh protocol translator 708 translates the message from a mesh format to an intermediate format. The ZigBee message translator 710 translates the message from the intermediate format to the ZigBee format. The ZigBee radio 712 then re-transmits the message from the home gateway 704 to the ZigBee target device 714.

Figure 8:
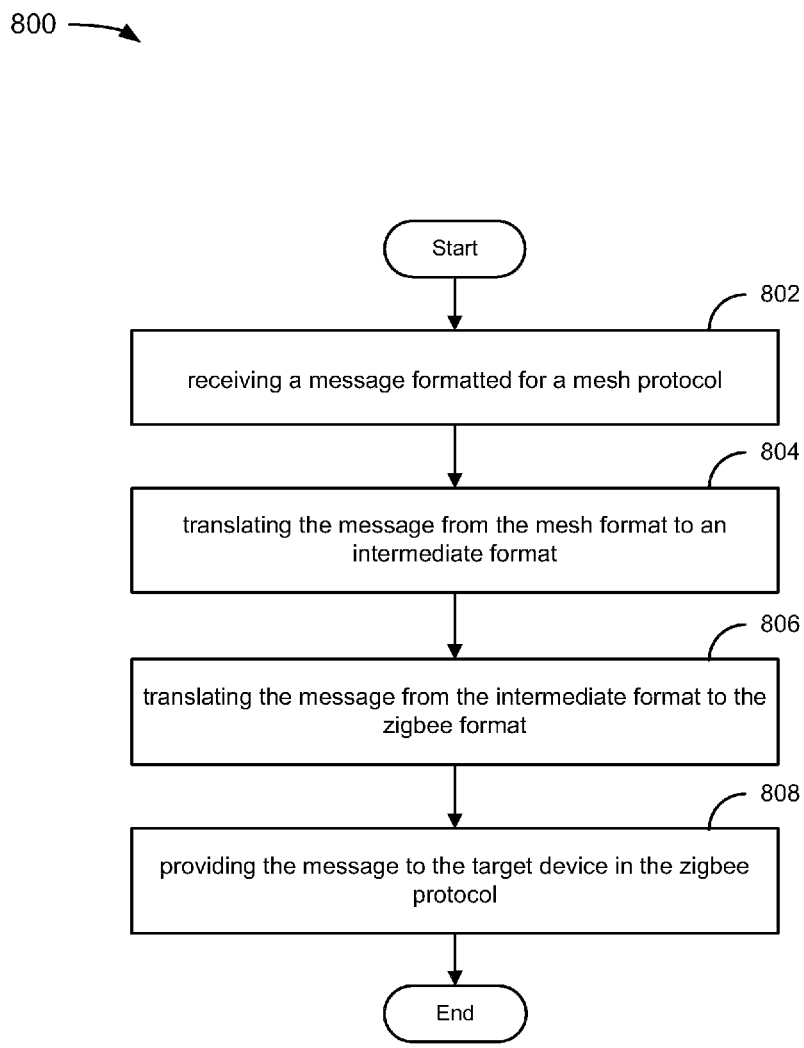
FIG. 8 depicts a flowchart of an exemplary method for providing a message to a target device in the ZigBee protocol.

FIG. 8 depicts a flowchart of a method 800 for providing a message to a target device in the ZigBee protocol. The method 800 is organized as a sequence of modules or steps in the flowchart. However, it should be understood that these and modules associated with other methods described herein may be reordered for parallel execution or into different sequences of modules.

In the example of FIG. 8, the method starts at module or step 802 with receiving a message formatted for a mesh protocol. The request may be received via a radio, or via a wired connection. The request may be structured as a table to the ANSI C12.19 format.

In the example of FIG. 8, the method continues to module 804 with translating the message from the mesh format to an intermediate format. In a non-limiting example the intermediate format may be plain text or another known or convenient format to translate to the ZigBee format.

In the example of FIG. 8, the method continues to module or step 806 with translating the message from the intermediate format, such as a plain text message, to the ZigBee protocol.

In the example of FIG. 8, the method continues to module or step 808 with providing the message to the target device in the ZigBee format. The message may be transmitted via a radio or wired connection to the target device.

Figure 9:
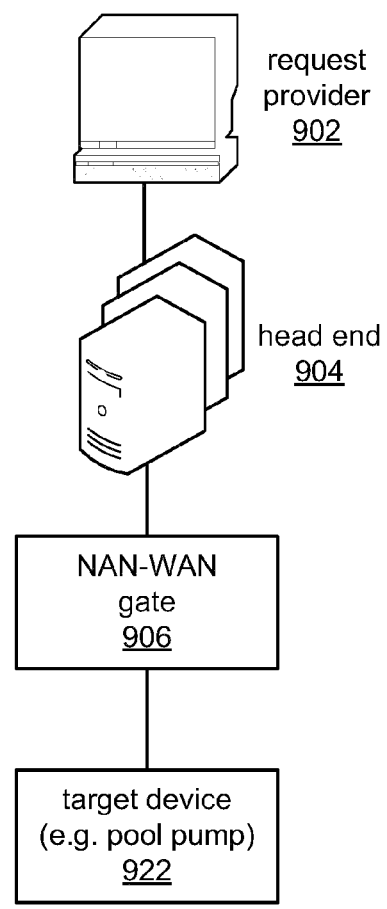
FIG. 9 depicts a non-limiting example of an exemplary system for controlling energy use of a pool pump.

FIG. 9 depicts a non-limiting example of a system 900 for controlling energy use of a pool pump, where a pool pump is just an example of a type of energy consuming device that may have a relatively high energy consumption but whose operation is not usually time critical. FIG. 9 includes a request provider 902, a head end 904, a NAN-WAN gate 906, and a target device (pool pump) 922.

In the example of FIG. 9, the request provider transmits a request to disable all pool pumps at 1 pm for one hour in a given neighborhood because of decreased energy availability at 1 pm for the one hour period. The head end 904 identifies a plurality of pool pumps in the area specified by the request. Messages identifying each of the pool pumps including the pool pump 922 are generated instructing the devices to cease energy consumption for an hour (or for some other duration of time or according to some other condition, rule, or policy). The message identifying the target device 922 is transmitted to NAN-WAN gate 906, the direct route to the target device 922. The NAN-WAN gate 906 then retransmits the message to the target device 922. The message is received and stored in the target device 922 memory. At 1 pm the target device 922 is disabled, and energy consumption ceases. After an hour, the target device 922 is allowed to resume energy consumption.

Figure 10:
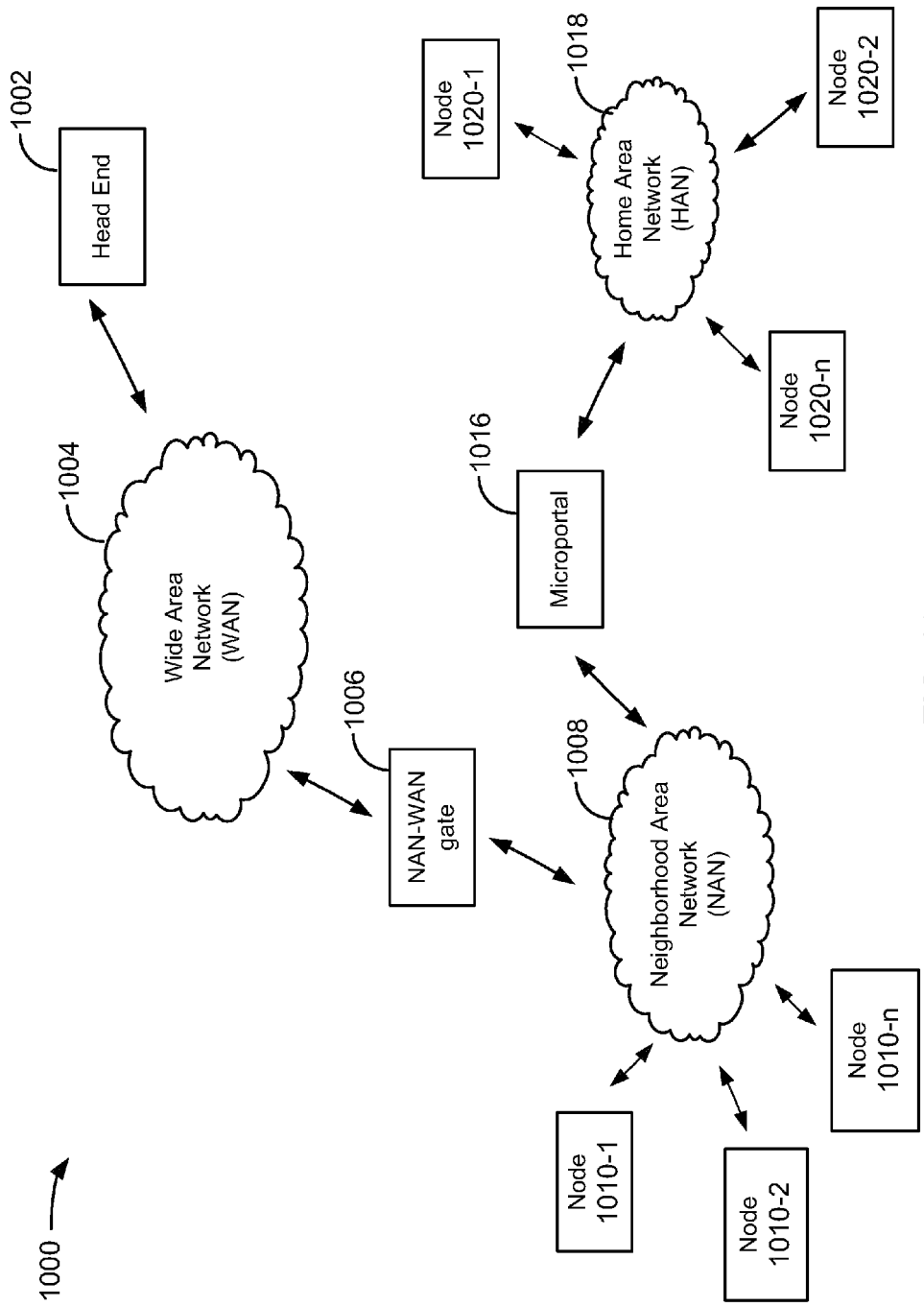
FIG. 10 depicts an exemplary configuration having a plurality of devices on an automated metering infrastructure (AMI) network.

FIG. 10 depicts an exemplary configuration having a plurality of devices on an automated metering infrastructure (AMI) network 1000. FIG. 10 includes head end 1002, wide area network (WAN) 1004, NAN-WAN gate 1006, neighborhood area network (NAN) 1008, node 1010-1, node 1010-2, node 1010-n (collectively nodes 1010), microportal 1016, home area network (HAN) 1018 (sometimes referred to as a premise area network (PAN)), node 1020-1, node 1020-2, node 1020-n (collectively nodes 1020).

The head end 1002, sometimes referred to as the back end, server, or head end server can include a suite of applications including functionality for an acquisition system, real-time data access, device management, network management, and other known or convenient functionality. The head end 1002 can include one or more computing devices coupled or otherwise networked together.

The WAN 1004 can be, for example, metropolitan area network (MAN), global area network such as the Internet, any combination of such networks, or any other known convenient medium for communicating data. The WAN 1004 can include routers, switches and/or other networking hardware elements coupled together to provide communications to systems or within systems and devices coupled to the network 1004.

The NAN-WAN gate 1006, sometimes referred to as a mesh gate/collector, can include an IEEE 802.15.4 PAN Coordinator, an ANSI C12.22 Relay, a device collecting messages from multiple units on the NAN and a firewall. An IEEE 802.15.4 PAN Coordinator may be a device that is responsible for communication between devices on a NAN and complies with the IEEE 802.15.4 standard for transmission of data that is in effect as of the date of filing of this patent application. An ANSI C12.22 Relay may be a device that is responsible for communication between devices on a NAN and complies with the ANSI C12.22 standard for transmission of data that is in effect as of the date of filing of this patent application. An access point operable to perform many functions including, for example, but not limited to, one or any combination of: relaying information from the head end server to the nodes, routing information, aggregating information from the nodes and micro portals within its sub-network for transmission to the head end server, acting as a HAN coordinator, transmitting mass firmware upgrades, and multicasting messages. A NAN-WAN gate 1006 may also be referred to as a collector because it collects information from the nodes 1010 and micro portal 1016 in its sub-network.

The NAN 1008, can be a wireless, wired, or mixed wireless and wired network. The NAN 1008 can transmit and receive signals using a protocol, for example, the IEEE 802.15.4 standard for transmission of data that is in effect as of the date of filing of this patent application can be used for wireless transmission. Similarly for wired transmission, the Ethernet/IEEE 802.3 interface standard could be used.

The nodes 1010 can be devices operable to collect metering information and transmit and receive signals via the NAN using any known or convenient protocol. Examples of nodes 1010 could be a meter, a thermostat, a remote appliance controller (RAC), in home display, or any known or convenient NAN device. Each of the nodes 1010 could potentially serve as a NAN-WAN gate by the addition of a WAN radio or wired device allowing communication over the WAN 1004.

The microportal 1016, sometimes referred to as a micro access portal or home gateway, may be a gateway in the sense that a protocol used by devices connected to the gateway use a different protocol than the gateway uses to connect to the nodes 1020. In a non-limiting example, ZigBee, Z-Wave, or X-4 may be used by the nodes 1020 to connect to the microportal 1016 whereas the microportal 1016 uses the Trilliant transport protocol to connect to the NAN-WAN gate 1006.

The HAN 1018 can be a wireless, wired, or mixed wireless and wired network. The NAN 1008 can transmit and receive signals using a protocol, by way of example and not limitation, the ZigBee, Z-Wave, or X-4 standard for transmission of data that is in effect as of the date of filing of this patent application can be used for wireless transmission. Similarly for wired transmission, the Ethernet/IEEE 802.3 interface standard could be used as well as other known or convenient wired interfaces.

The nodes 1020 can be devices operable to collect metering information and transmit and receive signals via the HAN 1018 using any known or convenient protocol. Examples of nodes 1020 could be a meter, a thermostat, a remote appliance controller (RAC), in home display, or any known or convenient NAN device. Each of the nodes 1010 could potentially serve as a microportal by the addition of a NAN radio or wired device allowing communication over the NAN 1008. Each of the nodes 1020 may include a radio and a processor coupled to a memory storing instructions. The nodes 1020, may each communicate using the ZigBee protocol, the Z-Wave protocol, X-10 or another known or convenient protocol.

It will be appreciated to those skilled in the art that the preceding examples and embodiments are exemplary and not limiting in scope. It is intended that all permutations, enhancements, equivalents, and improvements thereto that are apparent to those skilled in the art upon a reading of the specification and a study of the drawings are included within the true spirit and scope of these teachings. It is therefore intended that the following appended claims include all such modifications, permutations, and equivalents as fall within the true spirit and scope of these teachings.

What is claimed is:

1. A system comprising:
    a head end server;
    a plurality of target devices, wherein each of the target devices is in communication with the head end server and each target device belongs to one target device class of a plurality of target device classes;
    a request interface in communication with the head end server receiving an instruction to control energy use of a plurality of target devices belonging to a selected one target device class of the plurality of target device classes; and
    a scheduler in communication with the head end server, the scheduler receiving the instruction and identifying one or more target devices of the plurality of target devices belonging to the selected target device class;
    wherein the head end server transmits a message to the identified one or more target devices of the selected one targeted device class, to limit energy use of the identified target devices.

2. The system of claim 1, wherein a message includes a command to limit energy usage, and the command is overridden.

3. The system of claim 1, wherein the message includes a command to limit energy usage, and the command is not overridden.

4. The system of claim 1, wherein the request is received via the simple object access protocol (SOAP).

5. The system of claim 1, wherein the message is provided as a table request formatted for an ANSI C12.19 table.

6. A method comprising:
    receiving, by a request interface, a request to control energy use of a plurality of target devices, wherein each of the plurality of target devices belongs to one target device class of a plurality of target device classes;

providing, by the request interface, the request to a scheduler in communication with a head end server, to control energy use of a plurality of target devices belonging to a selected one target device class of the plurality of target device classes;

identifying, by a processor in a memory of the scheduler, one or more target devices belonging to the target device class;

creating, by a processor in a memory of the head end server, a message to limit energy use of the identified one or more target devices of the selected one targeted device class; and providing, by a processor in a memory of the head end server, the message to the identified one or more target devices of the selected one targeted device class, such that the energy use thereof is controlled.

7. The method of claim 6, wherein the message includes a command to limit energy usage, and the command is overridden.

8. The method of claim 6, wherein the message includes a command to limit energy usage, and the command is not overridden.

9. The method of claim 6, wherein the request is received via the simple object access protocol (SOAP).

10. The method of claim 6, wherein the message is provided as a table request formatted for an ANSI C12.19 table.

11. The method of claim 6, wherein the message is formatted to ANSI C12.22 format.

12. A computer program stored in a computer readable form for execution in a processor and a processor coupled memory to implement a method comprising:

receiving from a request interface in communication with the head end server a request to control energy use of one or more target devices of a plurality of target devices, wherein each of the plurality of target devices belongs to one target device class of a plurality of target device classes, providing the request to a scheduler at a head end server to identify the one or more target devices belonging to a selected one class of the plurality of target device classes;

creating a message to limit energy use of the identified one or more target devices of the selected one target device class; and providing the message to the identified one or more target devices of the selected one target device class such that the energy use thereof is controlled.

13. The computer program of claim 12, wherein the message includes a command to limit energy usage that can be overridden.

14. The computer program of claim 12, wherein the message includes a command to limit energy usage that can not be overridden.

15. The computer program of claim 12, wherein the request is received via the simple object access protocol (SOAP).

16. The computer program of claim 12, wherein the message is provided as a table request formatted for an ANSI C12.19 table.

17. The computer program of claim 12, wherein the message is formatted to ANSI C12.22 format.

* * * * *